(12) United States Patent
Zhou et al.

(10) Patent No.: US 12,444,807 B2
(45) Date of Patent: Oct. 14, 2025

(54) MODIFIED POLYPHENYLENE SULFIDE (PPS) AND PPS MODIFICATION METHOD, PPS SOLID SEPARATOR, PREFABRICATED ZINC SALT SEPARATOR AND MANUFACTURING METHOD THEREOF, TO-BE-FILLED ZINC-MANGANESE SECONDARY BATTERY, AND MANUFACTURING AND APPLICATION METHODS THEREOF

(71) Applicant: JIANGSU UNIVERSITY, Zhenjiang (CN)

(72) Inventors: Haitao Zhou, Zhenjiang (CN); Hongquan Gao, Zhenjiang (CN); Jianchun Wu, Zhenjiang (CN); Haiyun Zhou, Zhenjiang (CN); Shengjie Yao, Zhenjiang (CN); Hongwen Zhu, Zhenjiang (CN); Rongfei Yan, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/860,698

(22) PCT Filed: Apr. 8, 2024

(86) PCT No.: PCT/CN2024/086497
§ 371 (c)(1),
(2) Date: Oct. 28, 2024

(87) PCT Pub. No.: WO2024/212909
PCT Pub. Date: Oct. 17, 2024

(65) Prior Publication Data
US 2025/0174824 A1    May 29, 2025

(30) Foreign Application Priority Data

Apr. 13, 2023  (CN) .......................... 202310393324.5
Jan. 12, 2024  (CN) .......................... 202410046169.4

(51) Int. Cl.
*H01M 50/489*    (2021.01)
*C08J 3/20*    (2006.01)
(Continued)

(52) U.S. Cl.
CPC .......... *H01M 50/414* (2021.01); *C08J 3/203* (2013.01); *C08K 5/136* (2013.01); *H01M 4/043* (2013.01);
(Continued)

(58) Field of Classification Search
CPC ............. H01M 50/414; H01M 50/489; H01M 50/131; H01M 50/121; H01M 50/124;
(Continued)

(56) References Cited

U.S. PATENT DOCUMENTS 3,617,387 A * 11/1971 Grulke .................... H01M 6/06
429/162
2014/0050970 A1 * 2/2014 Li ......................... H01M 4/622
29/623.5
(Continued)

FOREIGN PATENT DOCUMENTS

CN    106450424 A    2/2017
CN    111864272 A    10/2020
(Continued)

OTHER PUBLICATIONS

Zhou et al. (Polyphenylene Sulfide-Based Solid-State Separator for Limited Li Metal Battery, Small 2021, 17, 2104365) (Year: 2021).*
(Continued)

*Primary Examiner* — Miriam Stagg
*Assistant Examiner* — Emily Elizabeth Freeman

(74) *Attorney, Agent, or Firm* — Bayramoglu Law Offices LLC

(57) ABSTRACT

Modified polyphenylene sulfide (PPS) and a PPS modification method, a PPS solid separator, a prefabricated zinc salt separator and a manufacturing method thereof, a to-be-filled zinc-manganese secondary battery and a manufacturing method, a formation method and an application method thereof are provided. Through hydrothermal synthesis, tetrachlorobenzoquinone in PPS powder undergoes a dechlorination and hydrogenation reaction to form molecules with a chlorocatechol structure, to improve the adsorption performance of the PPS solid separator towards harmful molecules. Moreover, in combination with the protection of welding spots during the battery assembly process, and a formation method involving injection of an aqueous electrolyte solution followed by alcohol during the formation process, the cycling stability of the battery is improved and the service temperature range of the battery is broadened.

12 Claims, 15 Drawing Sheets

(51) Int. Cl.

| | |
|---|---|
| *C08K 5/136* | (2006.01) |
| *H01M 4/04* | (2006.01) |
| *H01M 4/24* | (2006.01) |
| *H01M 4/26* | (2006.01) |
| *H01M 4/38* | (2006.01) |
| *H01M 4/62* | (2006.01) |
| *H01M 4/66* | (2006.01) |
| *H01M 10/04* | (2006.01) |
| *H01M 10/26* | (2006.01) |
| *H01M 10/28* | (2006.01) |
| *H01M 50/105* | (2021.01) |
| *H01M 50/121* | (2021.01) |
| *H01M 50/124* | (2021.01) |
| *H01M 50/131* | (2021.01) |
| *H01M 50/403* | (2021.01) |
| *H01M 50/414* | (2021.01) |
| *H01M 50/457* | (2021.01) |
| *H01M 50/538* | (2021.01) |
| *H01M 50/595* | (2021.01) |

(52) U.S. Cl.
CPC ............ *H01M 4/24* (2013.01); *H01M 4/26* (2013.01); *H01M 4/38* (2013.01); *H01M 4/623* (2013.01); *H01M 4/625* (2013.01); *H01M 4/662* (2013.01); *H01M 10/0431* (2013.01); *H01M 10/049* (2013.01); *H01M 10/26* (2013.01); *H01M 10/288* (2013.01); *H01M 50/105* (2021.01); *H01M 50/121* (2021.01); *H01M 50/124* (2021.01); *H01M 50/131* (2021.01); *H01M 50/403* (2021.01); *H01M 50/457* (2021.01); *H01M 50/489* (2021.01); *H01M 50/538* (2021.01); *H01M 50/595* (2021.01); *C08J 2381/02* (2013.01); *H01M 2300/0011* (2013.01)

(58) Field of Classification Search
CPC ............ H01M 50/538; H01M 50/403; H01M 50/105; H01M 50/457; H01M 50/595; H01M 4/043; H01M 4/24; H01M 4/26; H01M 4/38; H01M 4/623; H01M 4/625; H01M 4/662; H01M 10/0431; H01M 10/049; H01M 10/26; H01M 10/288; H01M 2300/0011; C08J 3/203; C08J 2381/02; C08K 5/136
See application file for complete search history.

(56) References Cited

U.S. PATENT DOCUMENTS

| | | | |
|---|---|---|---|
| 2017/0309951 A1* | 10/2017 | Ishikawa | H01M 50/586 |
| 2020/0028147 A1 | 1/2020 | Zhamu et al. | |
| 2020/0235421 A1* | 7/2020 | Zhou | H01M 10/0562 |
| 2021/0036375 A1* | 2/2021 | Sato | H01M 50/461 |
| 2021/0075054 A1* | 3/2021 | Nishimura | H01M 10/054 |
| 2022/0006157 A1* | 1/2022 | Nakazawa | H01M 50/417 |
| 2022/0223844 A1* | 7/2022 | Han | H01M 4/625 |
| 2022/0267653 A1* | 8/2022 | Kakutaka | C09J 183/04 |
| 2023/0187623 A1* | 6/2023 | Yadav | H01M 4/62 |
| | | | 429/224 |
| 2024/0380037 A1* | 11/2024 | Kagata | H01M 50/193 |

FOREIGN PATENT DOCUMENTS

| | | | |
|---|---|---|---|
| CN | 112898569 A | | 6/2021 |
| CN | 113078372 A | | 7/2021 |
| CN | 115588784 A | | 1/2023 |
| CN | 116130672 A | | 5/2023 |
| CN | 116825941 A | | 9/2023 |
| CN | 116826299 A | | 9/2023 |
| CN | 117264212 A | | 12/2023 |
| JP | 2009144141 A | * | 7/2009 |
| JP | 2012033443 A | | 2/2012 |

OTHER PUBLICATIONS

English Machine Translation of JP 2009144141 A (Year: 2009).*

* cited by examiner

MODIFIED POLYPHENYLENE SULFIDE (PPS) AND PPS MODIFICATION METHOD, PPS SOLID SEPARATOR, PREFABRICATED ZINC SALT SEPARATOR AND MANUFACTURING METHOD THEREOF, TO-BE-FILLED ZINC-MANGANESE SECONDARY BATTERY, AND MANUFACTURING AND APPLICATION METHODS THEREOF

CROSS REFERENCE TO THE RELATED APPLICATIONS

This application is the national phase entry of International Application No. PCT/CN2024/086497, filed on Apr. 8, 2024, which is based upon and claims priority to Chinese Patent Applications No. 202310393324.5, filed on Apr. 13, 2023, and No. 202410046169.4, filed on Jan. 12, 2024, the entire contents of which are incorporated herein by reference.

TECHNICAL FIELD

The present disclosure relates to the technical field of secondary batteries, and specifically to modified PPS and a PPS modification method, a PPS solid separator, a prefabricated zinc salt separator and a manufacturing method thereof, a to-be-filled zinc-manganese secondary battery and a manufacturing method and an application method thereof.

BACKGROUND

Aqueous zinc-manganese secondary batteries have attracted widespread attention from researchers in recent years due to their advantages such as safety, environmental friendliness, abundant resources, and low costs. However, commercialized ampere-hour-rated aqueous zinc-manganese secondary batteries have difficulties in application promotion due to their short lifespan and poor low-temperature performance. The existing improvement method is to add low-temperature additives such as alcohols, PEG, PVA, etc., to the aqueous electrolyte to form a eutectic solution to effectively reduce the freezing point of the electrolyte, thereby developing low-temperature zinc-manganese secondary batteries. However, the addition of additives increases the chances of side reactions, especially during the initial formation cycle, where a significant decrease in capacity is observed. This is caused by harmful components produced by the side reactions that shuttle between positive and negative electrodes, leading to mutual deterioration, and thus further improvement is required. In addition, Patent ZL202110122474.3 mentions the use of tetrachloro-p-benzoquinone as an anion adsorbent to form dipolar adsorption towards the harmful components, to increase cation migration through the separator, and effectively inhibit the occurrence of the side reactions. However, tetrachloro-p-benzoquinone has a high chlorine content, which may lead to corrosion failure of the current collector during long-term cycling.

Currently, electrode production processes for aqueous batteries commonly employ wet coating methods. However, US202211223026.3 and 202210355256.9 propose the use of a semi-dry process for manufacturing electrodes of zinc-manganese secondary batteries. Though the dry process for manufacturing the electrodes of zinc-manganese secondary batteries can effectively avoid problems such as uneven slurry, difficulty in viscosity control, complex solvent removal, electrode component stratification, and electrode powder shedding during the wet coating process, it also poses challenges. For instance, the porosity of electrodes made by the dry process is relatively low, less than 30%, leading to low electrolyte impregnation efficiency. Particularly, the electrolyte concentration of zinc-manganese secondary batteries is high (>2 mol/L), resulting in a high viscosity, making it difficult to achieve uniform impregnation. This leads to uneven distribution of the electrolyte in the battery electrodes and separators. To address this problem, methods such as increasing the impregnation time and elevating the standing temperature are typically employed to improve the impregnation effect. However, these methods undoubtedly lead to a waste of a large amount of time and energy, significantly reducing production efficiency of the battery.

Additionally, in the field of electrochemical energy storage, effective long-term storage and safe transportation of batteries are also pressing issues that need to be addressed. The current storage methods typically involve injecting the electrolyte into the battery beforehand, which poses safety hazards during transportation and storage. With the elapse of the storage time, the electrolyte in the battery will decompose, leading to substantial degradation of the capacity and even potential battery shorts, resulting in a waste of resources.

Chinese invention US202110380015.5 and patent application No. 202210444350.1 provide a sandwich-structured composite separator based on a PPS solid separator. Though this separator structure can effectively prevent dendrite formation, it still cannot address the infiltration issue of aqueous separators, leading to uneven distribution of the zinc salt inside ampere-hour-rated zinc-manganese secondary batteries and poor battery consistency.

Therefore, there is a need to develop a novel separator and secondary battery to solve the afore-mentioned problems.

SUMMARY

In one aspect, in order to solve the problems of a short life span and poor low-temperature performance of the commercialized ampere-hour-rated aqueous zinc-manganese secondary batteries, the present disclosure provides modified PPS suitable for long-life wide-temperature-range ampere-hour-rated zinc-manganese secondary batteries, and a manufacturing method thereof. Through hydrothermal synthesis, a dechlorination and hydrogenation reaction is conducted on tetrachloro-p-benzoquinone in PPS powder, to form chlorocatechin-structured molecules. This improves the adsorption performance of the PPS solid separator towards harmful molecules. Meanwhile, in combination with the protection of welding spots during battery assembly and a formation process including injection of an aqueous electrolyte solution followed by alcohol, the cycle stability of the battery is enhanced, the service temperature range of the battery is broadened, and low-temperature performance of the battery is improved.

A modification method of PPS suitable for solid separators of long-life wide-temperature-range ampere-hour-rated zinc-manganese secondary batteries is provided, including: mixing PPS powder, tetrachloro-p-benzoquinone, and deionized water in a mass ratio of 10:(0.25-0.75):(1-12) to conduct a hydrothermal reaction at 180° C. to 240° C., where during the hydrothermal reaction, tetrachloro-p-benzoquinone molecules undergo a reaction where chlorine ions are removed and hydroxyl groups are added, to form molecules with a chlorocatechol-like structure.

Further, the hydrothermal reaction is conducted at a constant temperature for 1 to 4 hours in a reaction atmosphere of air, oxygen, nitrogen, or argon.

Modified PPS produced by the modification method of PPS is provided, where the molecules with the chlorocatechin-like structure are loaded in a PPS solid separator; and the molecules with the chlorocatechin-like structure is one of, or a mixture of two or more of 2,5-dichlorohydroquinone, 2,3,5,6-tetrachlorophenol, 3,4,5-trichlorocatechol, tetrachlorohydroquinone, and 3,4,6-trichlorocatechol.

A PPS solid separator manufactured with the modified PPS is provided.

Further, the PPS solid separator manufactured with the modified PPS has zinc ion selective permeability.

In another aspect, the present disclosure further provides a prefabricated zinc salt separator, a to-be-filled zinc-manganese secondary battery, and a manufacturing method thereof. During a manufacturing process of the prefabricated zinc salt separator, an electrolyte zinc salt is prefabricated into glue liquid for laminating the solid separator with upper and lower support separators. This solves the problem of a high-concentration electrolyte in zinc-manganese secondary batteries being difficult to uniformly infiltrate into an internal structure of battery electrodes. Also, this enables the production of a to-be-filled zinc-manganese secondary battery that does not require electrolyte filling during storage or transportation, improving the production efficiency and battery performance of the zinc-manganese secondary batteries.

A manufacturing method of the prefabricated zinc salt separator is provided, including:

(1) providing one of a PPS solid separator A and an upper support separator B with a glue liquid C by dipping or coating, and bonding the PPS solid separator A and the upper support separator B together with the glue liquid C being located between the PPS solid separator A and the upper support separator B; laminating the upper support separator B with the PPS solid separator A through roll-pressing; and drying the upper support separator B and the PPS solid separator A that are laminated, to obtain a double-layer prefabricated zinc salt separator D; and (2) providing one of an exposed surface of the PPS solid separator A of the double-layer prefabricated zinc salt separator D and a lower support separator F with a glue liquid E by dipping or coating, and bonding the exposed surface of the PPS solid separator A of the double-layer prefabricated zinc salt separator D and the lower support separator F together with the glue liquid E being located between the exposed surface of the PPS solid separator A of the double-layer prefabricated zinc salt separator D and the lower support separator F; laminating the lower support separator F with the double-layer prefabricated zinc salt separator D to obtain a three-layer separator; and drying the three-layer separator to obtain a prefabricated zinc salt separator H;

where the upper support separator B and the lower support separator F are both porous separators, and the glue liquids C and E are each a mixture of an organic adhesive and/or an inorganic adhesive, an electrolyte zinc salt, and a solvent.

Further, a mass ratio of the organic adhesive, the inorganic adhesive, the electrolyte zinc salt, and the solvent is (0 to 10):(0 to 10):(10 to 80):(10 to 80).

Further, the organic adhesive is one of, or a mixture of two or more of polyvinyl alcohol (PVA), polyacrylic acid ester (PAA), and polytetrafluoroethylene (PTFE); the inorganic adhesive is one of, or a mixture of two or more of sodium bentonite, zinc dihydrogen phosphate, and lithium montmorillonite powder; the electrolyte zinc salt is one of, or a mixture of two or more of zinc trifluoromethanesulfonate, zinc sulfate, zinc chloride, and zinc perchlorate; and the solvent is one of, or a mixture of two or more of deionized water, N-methylpyrrolidone (NMP), alcohol, and propylene glycol.

Further, a thickness of the PPS solid separator A is 5 μm to 60 μm, and the porous separators each are one of a polyethylene (PE) separator, a polypropylene (PP) separator, a cellulose separator, a nonwoven fabric separator, and a polyethylene terephthalate (PET) separator, with a thickness of 3 μm to 30 μm.

Further, the glue liquids C and E are used in an amount of 5 mg/cm$^2$ to 30 mg/cm$^2$; each of the drying is conducted at a temperature 50° C. to 100° C.; after each of the drying, a dry glue single-layer loading is 2 mg/cm$^2$ to 15 mg/cm$^2$, and a thickness of the prefabricated zinc salt separator H is 70 μm to 200 μm.

A prefabricated zinc salt separator manufactured by the manufacturing method of the prefabricated zinc salt separator is provided, including the PPS solid separator A, and the upper support separator B and the lower support separator F located on both sides of the PPS solid separator A, where the mixture including the organic adhesive and/or the inorganic adhesive and the electrolyte zinc salt in a solid content mass ratio of (0) to 10):(0 to 10):(10 to 80) is filled between the upper support separator B and the PPS solid separator A and between the lower support separator F and the PPS solid separator A.

Further, the PPS solid separator A is manufactured with the modified PPS.

Further, manufacturing equipment for the PPS solid separator A includes a powder processing system, a high-speed shearing machine, a screw extruder, a horizontal cold roller press, and a horizontal hot roller press, where the powder processing system includes an air compressor, an air storage tank, a refrigerated air dryer, a drying adsorption tower, and a purification column connected in sequence, as well as an air preheating system, a powder heating system, a supersonic shear mixer, and a gas-solid separation tower; the supersonic shear mixer has a semi-enclosed cavity, a gas outlet of the purification column is connected to a gas inlet of the semi-enclosed cavity of the supersonic shear mixer, and the air preheating system is mounted on an air pipeline between the purification column and the supersonic shear mixer; the powder heating system is arranged at a feeding port of the semi-enclosed cavity of the supersonic shear mixer; a material outlet of the semi-enclosed cavity of the supersonic shear mixer is connected to the gas-solid separation tower through a pipeline; and an upper part of the gas-solid separation tower is equipped with a gas outlet, a bottom of the gas-solid separation tower is equipped with a material outlet, and a middle of the gas-solid separation tower is equipped with a pneumatic hammer inlet; and a powder processed by the powder processing system is charged to the high-speed shearing machine and then to the screw extruder, the horizontal cold roller press and the horizontal hot roller press are sequentially arranged downstream from the screw extruder, and a heating and conveying guide rail is arranged between the horizontal cold roller press and the horizontal hot roller press.

Further, a plurality of the drying adsorption towers are provided parallel and are connected to a gas outlet of the refrigerated air dryer and a gas inlet of the purification column respectively; and a gas source of a pneumatic hammer is a bypass of dry compressed air from the purification column, and the bypass intermittently releases compressed air to achieve a pneumatic hammer function.

Further, the manufacturing method of the PPS solid separator A includes the following steps:

(1) powder preparation:
dissolving metal chloride A in deionized water to form a solution B, mixing tetrachloro-p-benzoquinone with PPS powder to produce mixed powder C, mixing the solution B with the mixed powder C to form a slurry D, placing the slurry D into a closed reactor for hydrothermal reaction, and after the hydrothermal reaction, washing resulting powder to neutral and drying to produce powder E;

(2) fiberization:
mixing PTFE powder with the powder E uniformly in a mixer under a temperature condition such that the PTFE powder is in a glassy state, to obtain powder F;
subjecting dry air G to compression by an air compressor, cold drying, drying adsorption, purification, and preheating, followed by entrance into the semi-enclosed cavity through a nozzle and acceleration to a supersonic speed, to form a supersonic jet of extremely dry air H;
preheating and then charging the powder F into the semi-enclosed cavity and friction-shearing the powder F by the supersonic jet of the extremely dry air H, to allow molecular chains of PTFE in the powder F to extend and open, and physically adhere to powder in the powder F without undergoing a chemical reaction, to obtain powder I;
blowing the powder I with an airflow into the solid-gas separation tower equipped with a dust removal filter element, where the dust removal filter element is configured to separate a solid powder and a gas, the gas is directly discharged, and the solid powder adhering to the dust removal filter element is blown and shaken by the pneumatic hammer into a collection bin below; and (3) separator fabrication:
charging the powder I into the high-speed shearing machine for secondary fiberization to obtain a secondary-fiberized powder, feeding the secondary-fiberized powder into the screw extruder to obtain multiple continuous thick bars or continuous thick cakes J, charging the multiple continuous thick bars or continuous thick cakes J into the horizontal cold roller press for primary thinning, followed by feeding with heating through the heating and conveying guide rail into the horizontal hot roller press for secondary thinning, trimming two edges to produce a finished solid separator L, and winding up the finished solid separator L.

Further, in the powder preparation, the metal chloride A is one of, or a mixture of two or more of lithium chloride, sodium chloride, zinc chloride, magnesium chloride, and aluminum chloride; the PPS powder is crosslinked high-crystallinity PPS powder with a crystallinity of greater than 60% and a D50 of 3 μm to 25 μm; a mass ratio of the metal chloride, the deionized water, the tetrachloro-p-benzoquinone, and the PPS is (0) to 3):(3 to 30):(0.1 to 0.75):(5 to 15); and an atmosphere inside the closed reactor is air or argon, and the hydrothermal reaction is conducted at a temperature of 150° C. to 250° C. for 1 hour to 4 hours, with a volume filling rate of the hydrothermal reaction of 20% to 70%.

Further, in the fiberization, a relative humidity (RH) of the dry air G at room temperature of 25° C. is less than 10%; a power of the air compressor is greater than or equal to 15 KW, and preferably above 30 KW for continuous production; a dew point of the supersonic jet of the extremely dry air H is below −40° C.; and the drying adsorption is achieved by the plurality of the drying adsorption towers alternately undergoing operation and regeneration at an alternating time of 3 minutes to 12 minutes, where the plurality of the drying adsorption towers contain a molecular sieve with a total weight of greater than 200 kg.

Further, in the fiberization, a preheating temperature of the air before entering the nozzle is 30° C. to 60° C., and a preheating temperature of the powder F entering the semi-enclosed cavity is 40° C. to 220° C.

Further, in the separator fabrication, a shape of the multiple continuous thick bars or continuous thick cakes J is determined by an extrusion head mold of the screw extruder, with a diameter of the multiple continuous thick bars or a thickness of the multiple continuous thick cakes ranging from 3 mm to 12 mm; a roller surface temperature of the horizontal cold roller press is −10° C. to 30° C.; a thickness resulting from the primary thinning is 0.3 mm to 1.5 mm; a temperature of the heating and conveying guide rail is 90° C. to 150° C.; a roller surface temperature of the horizontal hot roller press is 110° C. to 160° C.; and a thickness resulting from the secondary thinning is 5 μm to 60 μm.

A manufacturing method of the to-be-filled zinc-manganese secondary battery manufactured with the prefabricated zinc salt separator is provided, where the prefabricated zinc salt separator H is arranged between a manganese oxide positive electrode and a zinc negative electrode, electrode tabs are welded, a battery cell is prepared by a stacking machine or a winding machine, the battery cell is placed into a battery case or an aluminum-plastic film pouch, and the battery case or the aluminum-plastic film pouch is sealed and stored for later use, where the battery case or the aluminum-plastic film pouch is provided with a sealable liquid injection port.

Further, the manganese oxide positive electrode is a manganese dioxide dry electrode manufactured by a semi-dry process, where the manganese oxide is one of, or a mixture of two or more of $\alpha$-$MnO_2$, $\beta$-$MnO_2$, $\gamma$-$MnO_2$, $\delta$-$MnO_2$, $Mn_2O_3$, $Mn_3O_4$, and $LiMn_2O_4$; and the zinc negative electrode is one of a zinc powder dry electrode manufactured by the semi-dry process, a zinc foil, and a zinc-plated copper foil.

Further, after the electrode tabs are welded, water-resistant and insulating protection is applied to welding spots.

Further, the water-resistant and insulating protection of the welding spots is achieved by wrapping with a water-resistant and insulating tape, applying an alumina coating, or coating with a resin; the resin is one or more of epoxy resin, phenolic resin, furan resin, and unsaturated polyester; and the electrode tabs are made of nickel, copper, titanium, or molybdenum.

Further, after the battery cell is prepared, an external clamping mechanism is used to increase a preload among the prefabricated zinc salt separator H, the manganese oxide positive electrode, and the zinc negative electrode, to reduce and control an electrode spacing to 50 μm to 120 μm.

Further, an outer packaging of the battery case is made of a water-resistant, gas-resistant and acid-resistant material, and the water-resistant, gas-resistant and acid-resistant material is a non-porous film.

Further, the non-porous film is preferably one of, or a composite film of two or more of a biaxially oriented polypropylene (BOPP) film, a cast polypropylene (CPP) film, a PET film, a PE film, and a PP film.

Further, a manufacturing method of the manganese oxide positive electrode is provided, including: mixing manganese dioxide with PTFE first, using a dry supersonic jet gas to allow molecular chains of the PTFE to open and physically adhere to a positive electrode material powder below a glass transition temperature of the PTFE, spraying an alcohol solution onto fiberized powder, performing internal mixing and shearing granulation followed by hot-rolling to form a positive electrode film, laminating multiple layers of the positive electrode film through multiple cold rolling to form a composite positive electrode self-supporting film with a thickness of 100 µm to 150 µm, and finally, laminating the composite positive electrode self-supporting film with a glue-coated sandblasted stainless steel foil through a hot roller press.

Further, a manufacturing method of the zinc negative electrode is provided, including:

mixing zinc powder, a conductive agent, a toughening conductive agent, a cationic retarder, and a hydrogen evolution inhibitor uniformly in a mixer to obtain powder A;

mixing PTFE powder and the powder A uniformly in a mixer under a temperature condition such that PTFE is in a glassy state, to obtain powder B;

mixing the powder B and an alcohol-water mixed solvent in a ball mill, where the PTFE is continuously rubbed by ball mill beads rotating at a high speed to form a network structure of PTFE filaments, molecular chains of the PTFE in the powder B are extended and opened, and physically adhered to powder in the powder A, the hydrogen evolution inhibitor undergoes a reduction reaction with a surface of the zinc powder, and after above processes are completed, filtration is conducted to obtain a gel mass C;

subjecting the gel mass C to internal mixing to form a uniform gel mass, and shear-granulating the uniform gel mass to produce millimeter-sized granules E of a uniform size;

hot-pressing the millimeter-sized granules E through the horizontal hot roller press to form a negative electrode film F, winding the negative electrode film F with a porous release paper as a support tape, and drying the negative electrode film F attached with the release paper as a whole to remove part of the solvent; and with a hot-press lamination process, thermally laminating a semi-dry negative electrode film F with the porous release paper removed onto both sides of a glue-coated stainless steel foil, to form the zinc negative electrode.

Further, the zinc powder is powdery particles with a particle size of 5 µm to 20 µm; the conductive agent is one or both of super-P and electrically conductive carbon black (ECP); the toughening conductive agent is one of, or a mixture of artificial graphite and high-purity graphite; the cationic retarder is inorganic powder that is electronegative and swells with water; the hydrogen evolution inhibitor is a metal compound that undergoes a reduction reaction with the zinc powder in an alcohol-water solvent; and a weight ratio of the zinc powder, the conductive agent, the toughening conductive agent, the cationic retarder, the PTFE, and the hydrogen evolution inhibitor is (60% to 90%):(1% to 10%):(1% to 10%):(1% to 10%):(3% to 15%):(0.1% to 5%).

Further, the cationic retarder is one or more of bentonite, montmorillonite powder, illite powder, kaolin powder, and halloysite powder; and the hydrogen evolution inhibitor is one or more of indium chloride, copper chloride, indium sulfate, and copper sulfate.

Further, the alcohol-water mixed solvent is a mixed solvent of water with isopropanol, propylene glycol, or ethanol, with a volume percentage of the water to alcohol of (40% to 80%):(20% to 60%); and a solid content of the uniform gel mass is 40% to 60%.

Further, when the millimeter-sized granules E are roll-pressed once by the horizontal hot roller press at a hot rolling temperature of 55° C. to 95° C., a thickness of the negative electrode film F of 90 µm to 200 µm is achieved.

Further, when the semi-dry negative electrode films F are thermally laminated with the glue-coated stainless steel foil, the glue-coated stainless steel foil is sandwiched between two negative electrode films F with the release paper removed; after unwound at a same speed, the glue-coated stainless steel foil and the two negative electrode films F are fed into two oppositely rotating horizontal hot roller presses at a rolling temperature of 30° C. to 120° C., where by adjusting a roll gap width and controlling a pressure, the negative electrode films F are right laminated on the glue-coated stainless steel foil, to avoid breaking the glue-coated stainless steel foil due to excessive deformation of the negative electrode films F caused by excessive rolling pressure.

Further, the glue-coated stainless steel foil is produced by printing a high-conductivity paste on both sides of a stainless steel foil with a gravure printing machine, where a surface of the stainless steel foil is sandblasted before the printing to remove a surface rolling oil, and the high-conductivity paste includes high-purity graphite, a non-hydrophilic adhesive, and a non-aqueous solvent.

A to-be-filled zinc-manganese secondary battery manufactured by the manufacturing method of the to-be-filled zinc-manganese secondary battery is provided, including a manganese oxide positive electrode, a zinc negative electrode, a three-layer prefabricated zinc salt separator H, and a battery case or an aluminum-plastic film pouch with a sealable liquid injection port, where the manganese oxide positive electrode, the zinc negative electrode, and the three-layer prefabricated zinc salt separator H are arranged inside the battery case or the aluminum-plastic film pouch after electrode tabs are welded.

An application method of the to-be-filled zinc-manganese secondary battery is provided, where the to-be-filled zinc-manganese secondary battery does not require liquid injection during storage or transportation; before the to-be-filled zinc-manganese secondary battery is put into use, pure water, seawater, or a dilute electrolyte is injected into the to-be-filled zinc-manganese secondary battery; preferably, the dilute electrolyte is a salt solution of one or more of zinc sulfate, sodium sulfate, magnesium sulfate, sodium chloride, and zinc trifluoromethanesulfonate with a concentration ranging from 0.01 mol/L to 1 mol/L, and a solvent is one of, or a mixture of two or more of water, ethanol, methanol, propylene glycol, isopropanol, and glycerol; and preferably, a liquid injection volume is 1 mL/Ah to 20 mL/Ah.

A formation method of the to-be-filled zinc-manganese secondary battery is provided, where during a battery formation process, an electrolyte with water exclusively as a solvent is injected into the to-be-filled zinc-manganese secondary battery, and then a primary discharge is conducted with a small current having a current density of 1 mA/g to 20 mA/g, followed by 0 to 40 cycles of charge and discharge; and under a discharge state, an organic solvent is injected, followed by vacuum packaging, where the organic solvent is an organic solvent that reduces a freezing point of the water after mixed with the water, and a volume ratio of the electrolyte to the organic solvent is 5:(0.3 to 5).

Further, the electrolyte with the water as the solvent is a 2 mol/L to 3 mol/L zinc trifluoromethanesulfonate aqueous solution, a 2 mol/L to 3 mol/L zinc sulfate aqueous solution, or a 2 mol/L to 3 mol/L zinc chloride aqueous solution; and a liquid injection volume is 3 mL/Ah to 10 mL/Ah.

Further, the organic solvent is alcohol, dimethyl sulfoxide, propylene carbonate, or acetonitrile.

Further, the alcohol is one of, or a mixture of two or more of methanol, isopropanol, ethylene glycol, propylene glycol, and glycerol.

The present disclosure has advantages as follows:

The manufacturing method of the prefabricated zinc salt separator described in the present disclosure involves the incorporation of an electrolytic zinc salt into the composite glue solution of a solid separator and upper and lower support separators during the separator manufacturing process, to obtain a composite separator with prefabricated zinc salt. This allows the zinc-manganese secondary battery manufactured with the prefabricated zinc salt separator to have an advantage of not requiring the injection of an electrolyte during storage or transportation. When the zinc-manganese secondary battery is put into use, only pure water, seawater, or a low-viscosity dilute electrolyte shall be injected into the battery. This not only effectively solves the problem that it is difficult for a high-concentration electrolyte to uniformly infiltrate into the battery electrode during the manufacturing process of zinc-manganese secondary batteries, and improves the battery performance, but also simplifies the manufacturing steps and improve the production efficiency of secondary batteries, enhancing the storage and transportation performance.

Moreover, before the use of the to-be-filled zinc-manganese secondary battery, only a liquid capable of forming an aqueous electrolyte environment needs to be added to the battery case or the aluminum-plastic film pouch to ensure normal charge and discharge of the zinc-manganese secondary battery. The choice of the added solution is extensive, including water, zinc-containing solutions, or solutions with different cations, such as seawater, to form a dual-cation or multi-cation system, leading to diversified positive electrode reactions. For instance, when pure water is added, zinc ions in the prefabricated zinc salt separator dissolve, and only zinc ions are present in the electrolyte. This results in dissolution-deposition reactions involving zinc-manganese oxides on the surface of the manganese oxide positive electrode. If seawater is added, the zinc ions of the prefabricated zinc salt separator dissolve and combine with sodium and magnesium ions in the seawater to form a multi-ion system. The smaller sodium ions will intercalate into the manganese oxide, and the coexistence of ion intercalation-deintercalation and dissolution-deposition mechanisms in the positive electrode can significantly increase the capacity of the aqueous secondary battery. Additionally, the multi-cation system can improve zinc deposition kinetics, to effectively avoid dendrites, and enhance the cycling stability of the system.

Compared with the prior art, the prefabricated zinc salt separator and the to-be-filled zinc-manganese secondary battery described in the present disclosure possess the following advantages:

(1) By pre-incorporating the electrolyte salt, its uniform distribution within the battery is ensured, effectively preventing excessive dendrite growth in specific regions.

(2) The electrolyte injection efficiency and overall production efficiency of the battery are significantly improved.

(3) The precipitation of the electrolyte salt during the cycling process of the zinc-manganese secondary battery is effectively avoided, thereby extending the cycle life of the battery and enhancing the storage life of the battery.

The manufacturing method of the modified PPS suitable for long-life, wide-temperature-range, and ampere-hour-rated zinc-manganese secondary batteries described in the present disclosure utilizes a simple hydrothermal synthesis method with inexpensive deionized water as the proton-providing reactant. During the hydrothermal reaction, tetrachloro-p-benzoquinone have some chloride ions removed, and the quinone group is hydrogenated to a hydroxyl group, forming an electron-withdrawing group that is more prone to binding with anions. The resulting chlorocatechol structure is more likely to undergo dipole adsorption with anions, fluorides, chlorides, hydrides, etc., effectively blocking the shuttle of harmful molecules between the positive and negative electrodes of the zinc-manganese secondary battery, significantly enhancing the ion transport of the PPS solid separator. Additionally, the chlorocatechol formed has a lower melting point, assisting the PPS separator in softening at processing temperatures ranging from 100° C. to 200° C., resulting in a thinner and smoother non-porous solid separator.

In the manufacturing process of the PPS solid separator described in the present disclosure, the air source used for the fibrillation process is dry atmospheric air with a relative humidity at room temperature of 25° C. of less than 10%. The purpose is to obtain extremely dry air with a dew point of −40° C. after passing through the cold-drying, drying, and adsorption steps of the production line, to minimize the energy consumption during the air drying process. An objective of obtaining the extremely dry air is to enable better fibrillation of PTFE, preventing moisture absorption caused by high static electricity of PTFE fibers after shearing and friction, which can lead to film breakage during subsequent pressing. In the present disclosure, a horizontal cold roller press is utilized first to perform primary thinning on continuous thick bars or thick cakes. The temperature during this step needs to be below the softening temperature of PPS (130° C.) in order to control the uniformity of material feed for subsequent hot roll-pressing. The purpose of using a heating and conveying guide rail is to heat the continuous thin cake resulting from the primary thinning (0.3 mm to 1.5 mm) to above the deformation temperature of PPS. After passing through the horizontal hot roller press, the PPS crystal particles undergo thermoplastic deformation, enabling better compression into a thin film. After thermal pressing, the edges of the film are trimmed, and the trimmed scraps can be recycled into a high-speed shearing machine, achieving 100% utilization of the powder, further reducing costs. The resulting PPS solid separator exhibits the following characteristics: low porosity, high electrical conductivity, high ion transport, strong ion selectivity, and significant ion rectification effects, effectively inhibiting metal anode dendrites.

The positive and negative electrodes of the present disclosure are prepared with a semi-dry method, where the powdery particles of the electrodes are entangled and bundled by fibrillated PTFE. During charge and discharge, the dissolution/deposition of the electrode materials does not lead to electrode pulverization. In the preparation process of the semi-dry zine powder negative electrode, the surface of the zinc powder is treated with indium plating, copper plating, acetylation, or phosphorylation, to effectively inhibit hydrogen evolution from the zinc powder. The addition of cationic chelating agents and other additives to the semi-dry zinc negative electrode stabilizes the ion concentration changes in the electrolyte, resulting in a more stable cycling performance. Moreover, the introduction of inorganic powders such as bentonite, montmorillonite, illite, kaolin, and halloysite into the semi-dry zinc negative electrode allows for a volumetric expansion of several to several dozen times upon contact with water. This effectively fixes the moisture, reduces the solid content of the gel mass, and prevents the gel mass from sticking to the roller during subsequent pressing due to an excessive solvent content. During the drying process after film formation, the inorganic powders undergo a volumetric shrinkage, introducing pores and increasing the porosity of the semi-dry electrode. The inorganic powders such as bentonite, montmorillonite, illite, kaolin, and halloysite, with their strong electronegativity, effectively absorb excess cations ($Mn^{2+}$, $H^+$, $Zn^{2+}$) in the electrolyte through their layered crystal structures, to play a role of a cationic retarder. This mitigates significant fluctuations in the cation concentration ($Mn^{2+}$, $H^+$, $Zn^{2+}$) in the electrolyte caused by the dissolution/deposition of active materials, stabilizes the electrolyte pH, and provides high reversibility to the system. Furthermore, in the present disclosure, hydrogen evolution inhibitors are directly introduced during the ball milling and fibrillation process. As the slurry is ball milled, the hydrogen evolution inhibitors undergo sufficient reduction reactions with the surface of the zinc powder, to fully passivate the surface of the zinc powder. This ensures effective inhibition of hydrogen evolution after the electrode is made. Additionally, the hydrophobic nature of the PTFE entanglement network also protects the zinc powder. The zinc negative electrode is designed to possess features of: (1) effectively suppressing the growth of dendrites; (2) providing cation release retardation; (3) exhibiting an excellent three-dimensional conductive network with abundant stripping/deposition active sites; (4) maintaining a stable PTFE entanglement network structure; (5) having a high porosity; and (6) effectively preventing hydrogen evolution from the zinc negative electrode.

In addition, during the assembly process of the zinc-manganese secondary battery of the present disclosure, water-resistant and insulation protection measures are taken for the welding spots, which is crucial in the cycling process of the zinc-manganese secondary battery. If the welding spots come into contact with the electrolyte, electrochemical corrosion is highly likely to occur during charge and discharge, leading to low battery energy efficiency and even circuit failure. An external clamping mechanism is provided to reduce the electrode spacing and enhance the close adhesion between electrode plates, thus avoiding side reactions such as hydrogen evolution and oxygen evolution caused by an excessive electrode spacing. This significantly reduces the occurrence of side reactions during charge and discharge, ensuring the cycling stability of the battery and significantly improving its electrochemical performance. The operating temperature range of the battery is also expanded without affecting capacity, rate performance, and energy density of the battery.

The present disclosure employs sandblasted stainless steel with glue liquid Coating. After sandblasting, rolling oil is removed from the stainless steel surface, and a resulting roughened surface exhibits stronger adhesion with the conductive layer and the zinc powder negative electrode film. The applied conductive glue layer is a mixture of high-purity graphite and non-hydrophilic adhesive, which can effectively prevent water corrosion of the stainless steel current collector and prevent detachment of the electrode film from the current collector foil.

During the formation process of the zinc-manganese secondary battery, an electrolyte with water exclusively as a solvent is injected first for initial formation, and then an alcohol solvent is added for subsequent formation. This approach avoids excessive participation of alcohol in side reactions during the initial cycling, which could lead to the generation of more harmful impurities. In the initial solvent, only water participates in the reaction. At room temperature, a hydrated solid electrolyte layer is preferentially formed to create a stable zinc ion migration shell. Then, alcohol is introduced to lower the freezing point of the solvent, preventing precipitation of electrolyte salts at low temperatures, thereby stabilizing and broadening the operating temperature range of the electrolyte.

BRIEF DESCRIPTION OF THE DRAWINGS

FIG. 1*l* shows a stacked core package of a to-be-filled zinc-manganese secondary battery of Example 8 before welding spot protection.

Figure 1:
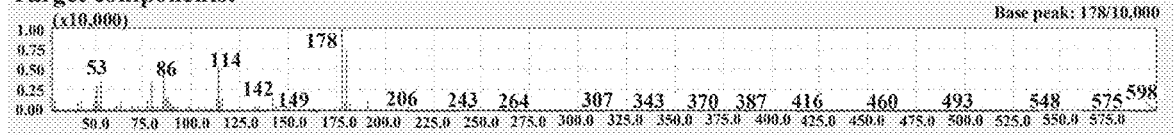
FIG. 1, FIG. 2, and FIG. 3 show pyrolysis gas chromatography-mass spectrometry (PGC-MS) of hydrothermally modified PPS powder, to confirm the presence of molecules with a chlorocatechin-like structure in the reaction products.
Figure 1:

In the drawings: 1—upper support separator B, 2—glue liquid C, 3—PPS solid separator A, 4—glue liquid E, 5—lower support separator F, 6—prefabricated zinc salt separator H, 7—positive electrode, 8—negative electrode, 9—wound core.

DETAILED DESCRIPTION OF THE EMBODIMENTS

To make the purpose, technical solutions, and advantages of the embodiments of the present disclosure clearer, the technical solutions in the embodiments of the present disclosure will be described below in a clear and complete manner. It is apparent that the embodiments described are a part of the embodiments of the present disclosure, not all embodiments. The elements and features described in one embodiment of the present disclosure can be combined with the elements and features shown in one or more other embodiments. It should be noted that for clarity, representations and descriptions of components and processes unrelated to the present disclosure and known to those of ordinary skill in the art have been omitted from the description. All other embodiments obtained by those of ordinary skill in the art without creative efforts based on the embodiments of the present disclosure fall within the scope of protection of the present disclosure.

The modification method of PPS suitable for a solid separator of a long-life, wide-temperature-range and ampere-hour-rated zinc-manganese secondary battery includes: mixing PPS powder, tetrachloro-p-benzoquinone, and deionized water as raw materials to conduct a hydrothermal reaction at a constant hydrothermal reaction temperature ranging from 180° C. to 240° C. for 1 hour to 4 hours, in a reaction atmosphere of air, oxygen, nitrogen, or argon. A mass ratio of the PPS powder, tetrachloro-p-benzoquinone, and deionized water is 10:(0.25-0.75):(1-12). In the hydrothermal reaction, the tetrachloro-p-benzoquinone molecules undergo a reaction where chloride ions are removed and hydroxyl groups are added, to form molecules with a chlorocatechol-like structure, including one of, or a mixture of two or more of 2,5-dichlorohydroquinone, 2,3,5,6-tetrachlorophenol, 3,4,5-trichlorocatechol, tetrachlorohydroquinone, 3,4,6-trichlorocatechol, and the like.

Example 1: Modification of PPS

Figure 2:
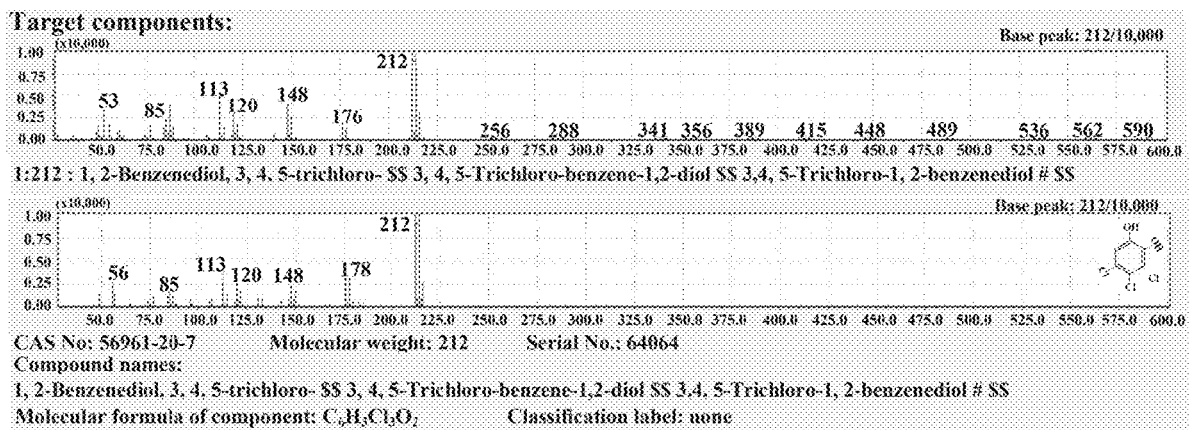
Figure 3:
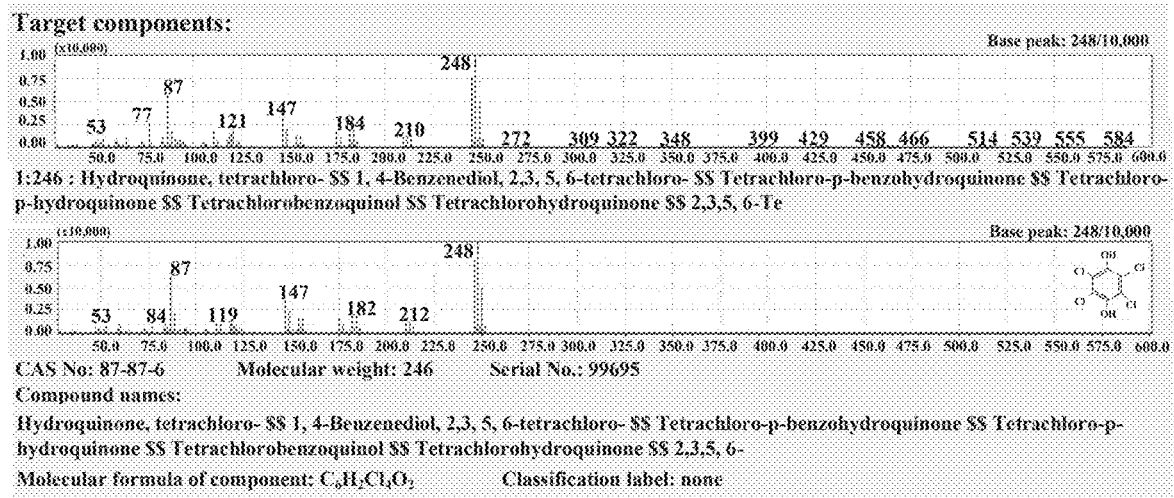

PPS powder, tetrachloro-p-benzoquinone, and deionized water were mixed in a mass ratio of 10:0.5:3, to conduct a hydrothermal reaction at 210° C. for 2 hours in a reaction atmosphere of air. After the hydrothermal reaction, the resulting powder was analyzed with PGC-MS. The results showed that the tetrachloro-p-benzoquinone molecules had undergone a reaction where chloride ions were removed and hydroxyl groups were added, to form molecules with a chlorocatechol-like structure, including 2,5-dichlorohydroquinone, 3,4,5-trichlorocatechol, and tetrachlorohydroquinone, as shown in FIGS. 1, 2, and 3, respectively.

Example 2: Modification of PPS

PPS powder, tetrachloro-p-benzoquinone, and deionized water were mixed in a mass ratio of 10:0.5:6, to conduct a hydrothermal reaction at 210° C. for 2 hours, in a reaction atmosphere of air. After the hydrothermal reaction, the resulting powder was analyzed with PGC-MS. The results revealed that the tetrachloro-p-benzoquinone molecules had undergone a reaction where chloride ions were removed and hydroxyl groups were added, to form molecules with a chlorocatechol-like structure, including 2,5-dichlorohydroquinone, 3,4,5-trichlorocatechol, tetrachlorohydroquinone, and 3,4,6-trichlorocatechol.

Figure 4A:
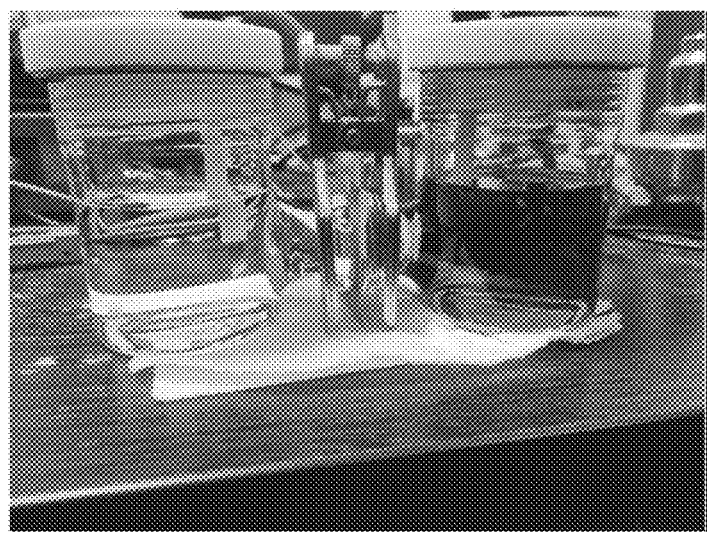
FIGS. 4A-4B show comparative photos of an H-shaped pool before and after electrodialysis in a selective permeability test of a PPS solid separator in Example 2.
Figure 4B:

A selective permeability test of the PSS solid separator manufactured with the modified PSS was performed as follows. The selective permeability of the PSS solid separator A was tested with an H-shaped pool and an electrodialysis method. 70 mL of a pH 4 colorless transparent dilute sulfuric acid was added to an anode pool of the H-shaped pool, and 70 mL of a dark-brown transparent aqueous mother liquor was added to a cathode pool. The mother liquor contained 1 mol/L $ZnSO_4$, 0.1 mol/L $Na_2SO_4$, 0.1 mol/L $Li_2SO_4$, 0.1 mol/L $MnSO_4$, 0.1 mol/L $NiSO_4$, 0.1 mol/L $CoSO_4$, 0.1 mol/L $CuSO_4$, 0.1 mol/L $FeSO_4$, 0.1 mol/L $K_2SO_4$, and 0.1 mol/L $MgSO_4$. Both the anode and the cathode were Pt metal electrodes, and a 24-hour continuous electrodialysis test was conducted at a 3.25 V cell voltage. FIGS. 4A-4B show comparative photos of the H-shaped pool before and after electrodialysis. After the electrodialysis, dilute sulfuric acid in the cathode pool on the left had no color change, a large amount of sediment appeared under the electrode, and a large amount of sediment and a small amount of bubbles occurred on a surface of the Pt electrode. The anode pool on the right remained the dark-brown color of the heavy metal. Table I shows metal ion concentrations measured by ICP in the mother liquor before and after the electrodialysis. It was confirmed that only zinc ions passed through the PPS solid separator A, which is the core factor ensuring high performance of the to-be-filled zinc-manganese secondary battery.

TABLE 1

| Metal ion concentrations in mother liquor before and after electrodialysis | | |
|---|---|---|
| Elements | Before zinc extraction | After zinc extraction |
| Zn | 0.98 mol/L | 0.350 mol/L |
| Na | 0.199 mol/L | 0.190 mol/L |
| Fe | 0.099 mol/L | 0.099 mol/L |
| Li | 0.198 mol/L | 0.154 mol/L |
| Mg | 0.102 mol/L | 0.101 mol/L |
| Ni | 0.099 mol/L | 0.097 mol/L |
| Cu | 0.103 mol/L | 0.100 mol/L |
| K | 0.196 mol/L | 0.195 mol/L |
| Mn | 0.097 mol/L | 0.093 mol/L |
| Co | 0.099 mol/L | 0.097 mol/L |

The prefabricated zinc salt separator according to the present disclosure includes a PPS solid separator A, an upper support separator B and a lower support separator F located on both sides of the PPS solid separator A. Between the upper support separator B and the PPS solid separator A, and between the lower support separator F and the PPS solid separator A, a mixture of an organic adhesive and/or an inorganic adhesive and an electrolyte zinc salt is filled.

Figure 5:
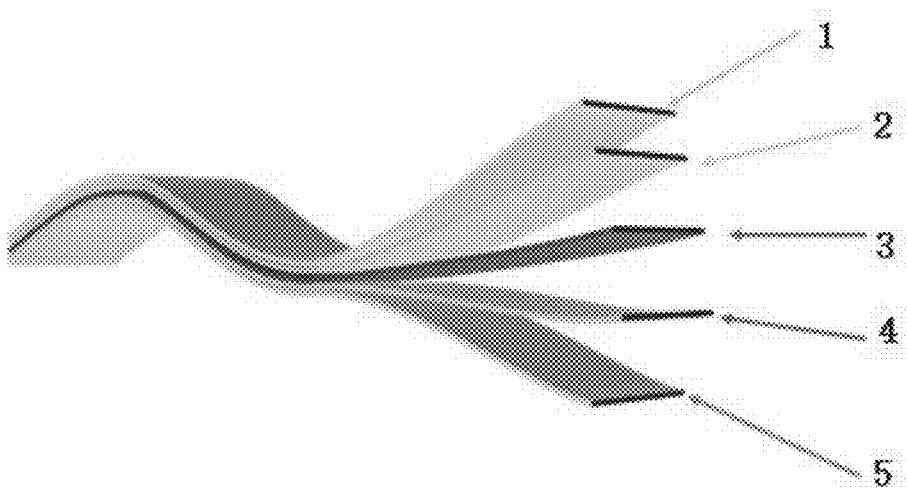
FIG. 5 is a schematic structural view of a prefabricated zinc salt separator according to the present disclosure.

As shown in FIG. 5, the composition of the glue liquid C located between the upper support separator B and the PPS solid separator A can be the same as or different from the glue liquid E located between the lower support separator F and the PPS solid separator A. The ratio of the organic adhesive, the inorganic adhesive, the electrolyte salt, and the solvent in the glue liquids C and E was (0 to 10):(0 to 10):(10 to 80):(10 to 80). The glue liquids C and E were used in amounts of 5 mg/cm$^2$ to 30 mg/cm$^2$. After drying, solid mixed glue layers were formed, with a dry glue single-layer loading of 2 mg/cm$^2$ to 15 mg/cm$^2$. The thickness of the prefabricated zinc salt separator ranged from 70 μm to 200 μm. The organic adhesive was one of, or a mixture of two or more of polymer adhesives such as PVA, PAA, and PTFE. The inorganic adhesive was one of, or a mixture of two or more of inorganic powders such as sodium bentonite, zinc dihydrogen phosphate, and lithium montmorillonite powder. The electrolyte salt was one of, or a mixture of two or more of inorganic salts such as zinc trifluoromethanesulfonate, zinc sulfate, zinc chloride, and zinc perchlorate. The solvent was one of, or a mixture of two or more of solvents such as deionized water, NMP, alcohol, and propylene glycol.

The thickness of the PPS solid separator A was 5 μm to 60 μm. Both the upper support separator B and the lower support separator F were porous separators, and their materials and thicknesses could be the same or different; and they were selected from porous separators such as PE separators, PP separators, cellulose separators, non-woven fabric separators, and PET separators, with a thickness of 3 μm to 30 μm.

The manufacturing method of the prefabricated zinc salt separator includes dipping the gel liquid from a gel liquid storage tank or coating the gel liquid onto the separator, followed by lamination of the three separators. The following examples will be specifically illustrated with the dipping method.

The to-be-filled zinc-manganese secondary battery included a positive electrode, a negative electrode, and the prefabricated zinc salt separator. The zinc salt separator H was arranged between the manganese oxide positive electrode and the zinc negative electrode, and electrode tabs were welded. A battery cell was prepared by a stacking machine or a winding machine, and arranged in a battery case or an aluminum-plastic film pouch with a sealable liquid injection port. The battery case or the aluminum-plastic film pouch was sealed and stored for later use. In the to-be-filled zinc-manganese secondary battery, the manganese oxide positive electrode was a manganese dioxide dry electrode made with a semi-dry method, and the manganese oxide was one of, or a mixture of two or more of manganese oxides such as α-MnO$_2$, β-MnO$_2$, γ-MnO$_2$, δ-MnO$_2$, Mn$_2$O$_3$, Mn$_2$O$_4$, and LiMn$_2$O$_4$. The zinc negative electrode was one of a zinc powder dry electrode made with a semi-dry method, a zinc foil, a zinc-coated copper foil, and the like.

During storage, the to-be-filled zinc-manganese secondary battery does not require liquid injection. When it is needed to put the battery into use, pure water, seawater, or a dilute electrolyte is injected into the battery. The liquid injection volume ranges from 1 mL/Ah to 20 mL/Ah. After the liquid injection port is sealed, a zinc-manganese secondary battery capable of charge and discharge is obtained. The dilute electrolyte is a salt solution of one or more of zinc sulfate, sodium sulfate, magnesium sulfate, sodium chloride, zinc trifluoromethanesulfonate, and the like, with a concentration of 0.01 mol/L to 1 mol/L. The solvent is one of, or a mixture of two or more of water, ethanol, methanol, propylene glycol, isopropanol, and glycerol. The dilute electrolyte may also be seawater directly.

Example 3: Prefabricated Zinc Salt Separator and to-be-Filled Zinc-Manganese Secondary Battery The PPS solid separator A was fed into a coating machine via a guide rail. The upper support separator B was allowed to pass through a glue tank containing glue liquid C to pick up the glue liquid C, and the excess glue liquid C was scraped off by a scraper. The upper support separator B was laminated with the PPS solid separator A on a platform, and then the lamination was completed through roll-pressing. The upper support separator B was a hydrophilic PE separator, and the glue liquid C was composed of PVA, zinc dihydrogen phosphate, an electrolyte salt zinc trifluoromethanesulfonate, and water, in a mass ratio of 1:1:50:48. The laminated separator was dried in a tunnel oven at a temperature of 70° C., and cut to obtain a double-layer prefabricated zinc salt separator D. The double-layer prefabricated zinc salt separator D was wound up.

Figure 6:
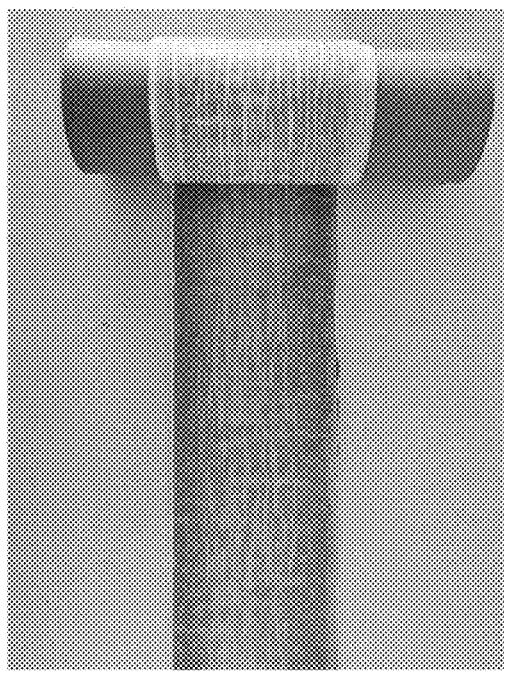
FIG. 6 is a photograph of a prefabricated zinc salt separator in Example 1.

The PPS side of the double-layer prefabricated zinc salt separator D was allowed to pass through a glue tank containing glue liquid E to pick up the glue liquid E, and the excess glue liquid E was scraped off by a scraper. The double-layer prefabricated zinc salt separator D was laminated with the lower support separator F on a platform, and then the lamination was completed through roll-pressing. The lower support separator F was a hydrophilic PE separator, and the glue liquid E was composed of PVA, sodium bentonite, an electrolyte salt zinc trifluoromethanesulfonate, and water, in a mass ratio of 1:1:50:48. The laminated three-layer separator was dried in a tunnel oven at a temperature of 70° C. to obtain a three-layer prefabricated zinc salt separator H. The three-layer prefabricated zinc salt separator H was wound up. The appearance of the prefabricated zinc salt separator produced in this example is shown in FIG. 6.

Figure 7:
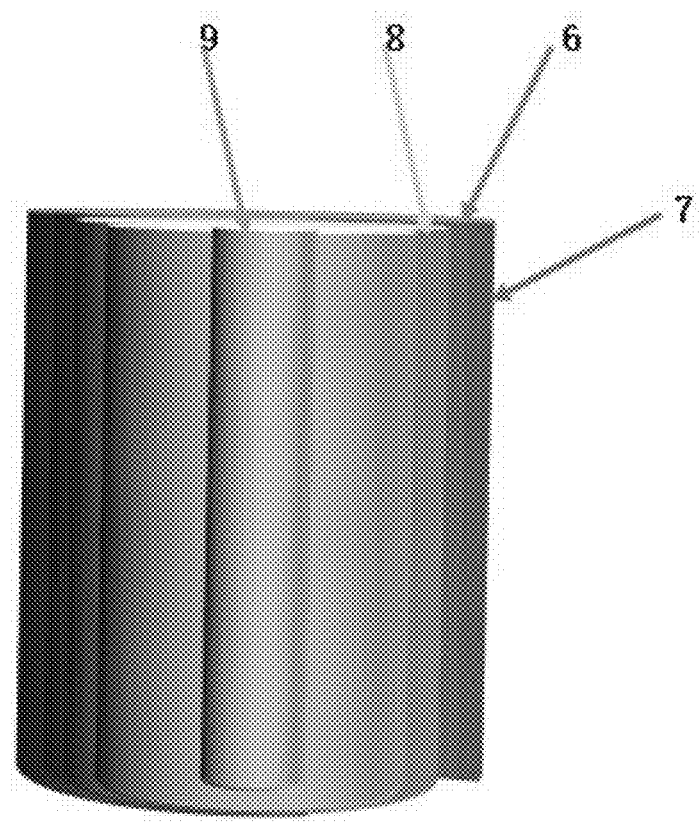
FIG. 7 is a schematic structural view of a battery cell of a to-be-filled zinc-manganese secondary cylindrical battery after winding according to the present disclosure.
Figure 8:
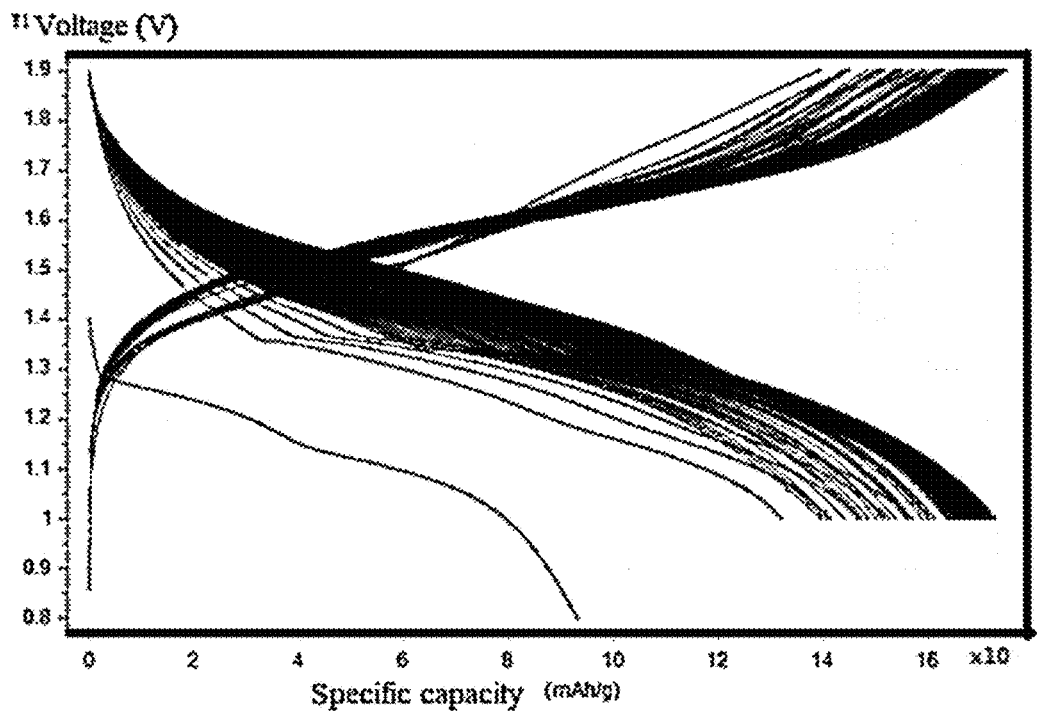
FIG. 8 is a charge-discharge curve of the to-be-filled zinc-manganese secondary cylindrical battery in Example 1 after injection of seawater.
Figure 9:
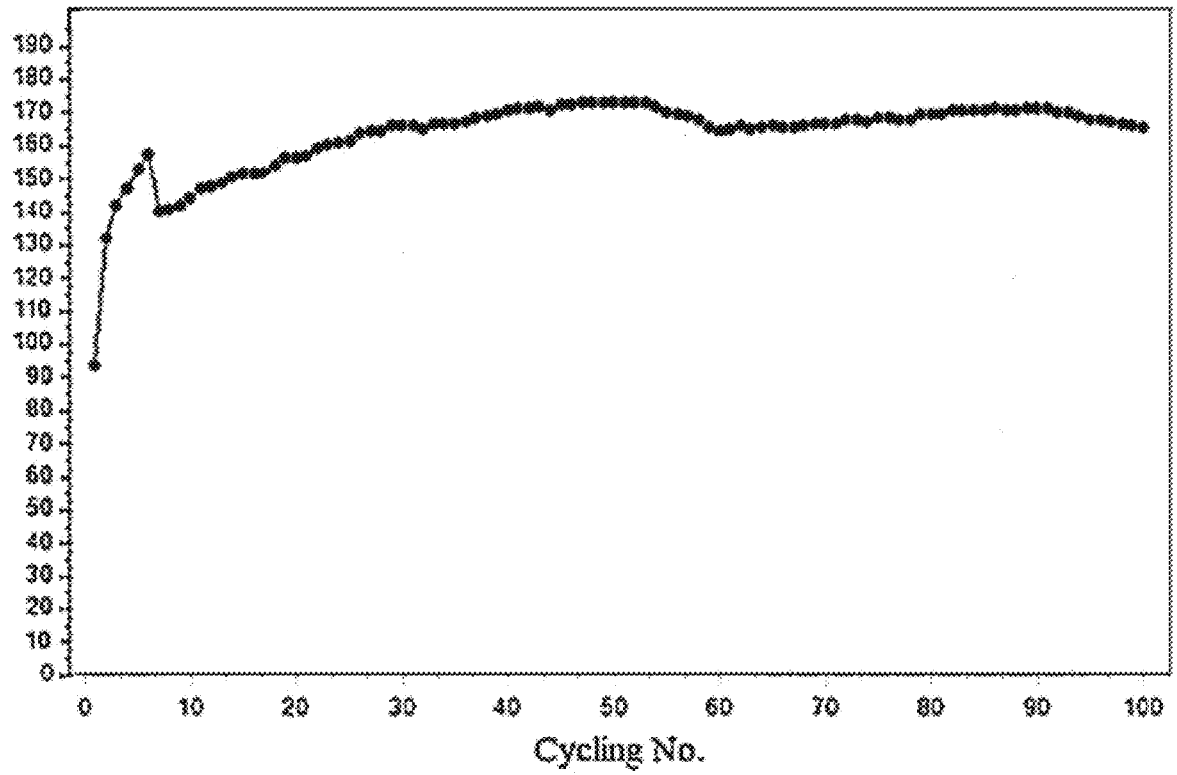
FIG. 9 is a charge-discharge cycle graph of the to-be-filled zinc-manganese secondary cylindrical battery in Example 1 after injection of seawater.

A β-MnO$_2$ dry electrode and a zinc powder dry electrode were used as the positive and negative electrodes respectively, and were wound with the prefabricated zinc salt separator H to form a battery cell. The battery cell was mounted into an 18650-battery case to produce a to-be-filled zinc-manganese secondary cylindrical battery. FIG. 7 is a schematic structural view of a battery cell of the to-be-filled zinc-manganese secondary cylindrical battery after winding. When it is needed to put the battery into use, seawater is injected into the battery, in a volume of 5 mL/Ah. After the liquid injection port is sealed, the zinc-manganese secondary battery can be charged and discharged. FIG. 8 shows a charge-discharge curve of the to-be-filled zinc-manganese secondary cylindrical battery in this example after the injection of seawater. The charge-discharge curve is consistent with conventional zinc-manganese secondary batteries. FIG. 9 shows a charge-discharge cycle graph of the to-be-filled zinc-manganese secondary cylindrical battery in this example after the injection of seawater. The battery exhibited stable cycling performance with no significant decay after 150 cycles.

Furthermore, in order to ensure that exposed areas of the electrodes do not undergo side reactions of hydrogen and oxygen evolution during charge and discharge, an insulating waterproof tape was employed in this example to protect exposed areas of collectors of the β-MnO$_2$ dry electrode and the zinc powder dry electrode. The stainless steel collectors and the electrode tabs were welded together through resistance welding. The outer packaging of the to-be-filled zinc-manganese secondary battery was made of a PP material, with a clamping mechanism outside to reduce the electrode spacing to 65 μm.

Example 4: Prefabricated Zinc Salt Separator and to-be-Filled Zinc-Manganese Secondary Battery The PPS solid separator A was fed into a coating machine via a guide rail. The upper support separator B was allowed to pass through a glue tank containing glue liquid C to pick up the glue liquid C, and the excess glue liquid C was scraped off by a scraper. The upper support separator B was laminated with the PPS solid separator A on a platform, and then the lamination was completed through roll-pressing. The upper support separator B was a hydrophilic PP separator, and the glue liquid C was composed of PAA, zinc dihydrogen phosphate, an electrolyte salt zinc trifluoromethanesulfonate, and water, in a mass ratio of 1:2:45:52. The laminated separator was dried in a tunnel oven at a temperature of 80° C., and cut to obtain a double-layer prefabricated zinc salt separator D. The double-layer prefabricated zinc salt separator D was wound up.

The PPS side of the double-layer prefabricated zinc salt separator D was allowed to pass through a glue tank containing glue liquid E to pick up the glue liquid E, and the excess glue liquid E was scraped off by a scraper. The double-layer prefabricated zinc salt separator D was laminated with the lower support separator F on a platform, and then the lamination was completed through roll-pressing. The lower support separator F was a hydrophilic PE separator, and the glue liquid E was composed of PAA, sodium bentonite, an electrolyte salt zinc trifluoromethanesulfonate, and water, in a mass ratio of 1:2:45:52. The laminated three-layer separator was dried in a tunnel oven at a temperature of 80° C. to obtain a three-layer prefabricated zinc salt separator H. The three-layer prefabricated zinc salt separator H was wound up.

A γ-$MnO_2$ dry electrode and a zinc foil were used as positive and negative electrodes respectively, and were laminated with the prefabricated zinc salt separator H to form a battery cell. The battery cell was encased in an aluminum-plastic film to produce a to-be-filled zinc-manganese secondary battery. When it is needed to put the battery into use, a 0.5 mol/L $ZnSO_4$ solution is injected into the battery, in a volume of 10 mL/Ah. After the liquid injection port is sealed, the battery can be charged and discharged.

Example 5: Prefabricated Zinc Salt Separator and to-be-Filled Zinc-Manganese Secondary Battery The PPS solid separator A was fed into a coating machine via a guide rail. The upper support separator B was allowed to pass through a glue tank containing glue liquid C to pick up the glue liquid C, and the excess glue liquid C was scraped off by a scraper. The upper support separator B was laminated with the PPS solid separator A on a platform, and then the lamination was completed through roll-pressing. The upper support separator B was a hydrophilic PP separator, and the glue liquid C was composed of PTFE, zinc dihydrogen phosphate, an electrolyte salt zinc sulfate, and water, in a mass ratio of 5:7:38:50. The laminated separator was dried in a tunnel oven at a temperature of 100° C., and cut to obtain a double-layer prefabricated zinc salt separator D. The double-layer prefabricated zinc salt separator D was wound up.

The PPS side of the double-layer prefabricated zinc salt separator D was allowed to pass through a glue tank containing glue liquid E to pick up the glue liquid E, and the excess glue liquid E was scraped off by a scraper. The double-layer prefabricated zinc salt separator D was laminated with the lower support separator F on a platform, and then the lamination was completed through roll-pressing. The lower support separator F was a hydrophilic PE separator, and the glue liquid E was composed of PTFE, lithium montmorillonite, an electrolyte salt zinc sulfate, and water, in a mass ratio of 5:7:38:50. The laminated three-layer separator was dried in a tunnel oven at a temperature of 100° C. to obtain a three-layer prefabricated zinc salt separator H. The three-layer prefabricated zinc salt separator H was wound up.

A $LiMn_2O_4$ dry electrode and a zinc powder dry electrode were used as positive and negative electrodes respectively, and were laminated with the prefabricated zinc salt separator H to form a battery cell. The battery cell was encased in an aluminum-plastic film to produce a to-be-filled zinc-manganese secondary battery. When it is needed to put the battery into use, water is injected into the battery, in a volume of 8 mL/Ah. After the liquid injection port is sealed, the battery can be charged and discharged.

Example 6: Prefabricated Zinc Salt Separator and to-be-Filled Zinc-Manganese Secondary Battery The PPS solid separator A was fed into a coating machine via a guide rail. The upper support separator B was allowed to pass through a glue tank containing glue liquid C to pick up the glue liquid C, and the excess glue liquid C was scraped off by a scraper. The upper support separator B was laminated with the PPS solid separator A on a platform, and then the lamination was completed through roll-pressing. The upper support separator B was a hydrophilic PP separator, and the glue liquid C was composed of PTFE, zinc dihydrogen phosphate, an electrolyte salt zinc sulfate, and water, in a mass ratio of 5:7:38:50. The laminated separator was dried in a tunnel oven at a temperature of 100° C., and cut to obtain a double-layer prefabricated zinc salt separator D. The double-layer prefabricated zinc salt separator D was wound up.

The PPS side of the double-layer prefabricated zinc salt separator D was allowed to pass through a glue tank containing glue liquid E to pick up the glue liquid E, and the excess glue liquid E was scraped off by a scraper. The double-layer prefabricated zinc salt separator D was laminated with the lower support separator F on a platform, and then the lamination was completed through roll-pressing. The lower support separator F was a hydrophilic PE separator, and the glue liquid E was composed of PTFE, lithium montmorillonite, an electrolyte salt zinc sulfate, and water, in a mass ratio of 5:7:38:50. The laminated three-layer separator was dried in a tunnel oven at a temperature of 100° C. to obtain a three-layer prefabricated zinc salt separator H. The three-layer prefabricated zinc salt separator H was wound up.

A $LiMn_2O_4$ dry electrode and a zinc powder dry electrode were used as positive and negative electrodes respectively, and were laminated with the prefabricated zinc salt separator H to form a battery cell. The battery cell was encased in an aluminum-plastic film to produce a to-be-filled zinc-manganese secondary battery. When it is needed to put the battery into use, a 1 mol/L mixed solution of $MgSO_4$ and NaCl is injected into the battery, in a volume of 7 mL/Ah. After the liquid injection port is sealed, the battery can be charged and discharged.

Example 7: Prefabricated Zinc Salt Separator and to-be-Filled Zinc-Manganese Secondary Battery The PPS solid separator A was fed into a coating machine via a guide rail. The upper support separator B was allowed to pass through a glue tank containing glue liquid C to pick up the glue liquid C, and the excess glue liquid C was scraped off by a scraper. The upper support separator B was laminated with the PPS solid separator A on a platform, and then the lamination was completed through roll-pressing. The upper support separator B was a cellulose separator, and the glue liquid C was composed of PTFE, zinc dihydrogen phosphate, an electrolyte salt zinc sulfate, and water, in a mass ratio of 4:2:52:40. The laminated separator was dried in a tunnel oven at a temperature of 85° C., and cut to obtain a double-layer prefabricated zinc salt separator D. The double-layer prefabricated zinc salt separator D was wound up.

The PPS side of the double-layer prefabricated zinc salt separator D was allowed to pass through a glue tank containing glue liquid E to pick up the glue liquid E, and the excess glue liquid E was scraped off by a scraper. The double-layer prefabricated zinc salt separator D was laminated with the lower support separator F on a platform, and then the lamination was completed through roll-pressing. The lower support separator F was a cellulose separator, and the glue liquid E was composed of PTFE, lithium montmorillonite, an electrolyte salt zinc sulfate, and water, in a mass ratio of 4:2:52:40. The laminated three-layer separator was dried in a tunnel oven at a temperature of 85° C. to obtain a three-layer prefabricated zinc salt separator H. The three-layer prefabricated zinc salt separator H was wound up.

A $LiMn_2O_4$ dry electrode and a zinc powder dry electrode were used as positive and negative electrodes respectively, and were laminated with the prefabricated zinc salt separator H to form a battery cell. The battery cell was encased in an aluminum-plastic film to produce a to-be-filled zinc-manganese secondary battery. When it is needed to put the battery into use, a 1 mol/L mixed solution of $Na_2SO_4$ and KCl is injected into the battery, in a volume of 8 mL/Ah. After the liquid injection port is sealed, the battery can be charged and discharged.

Figure 10:
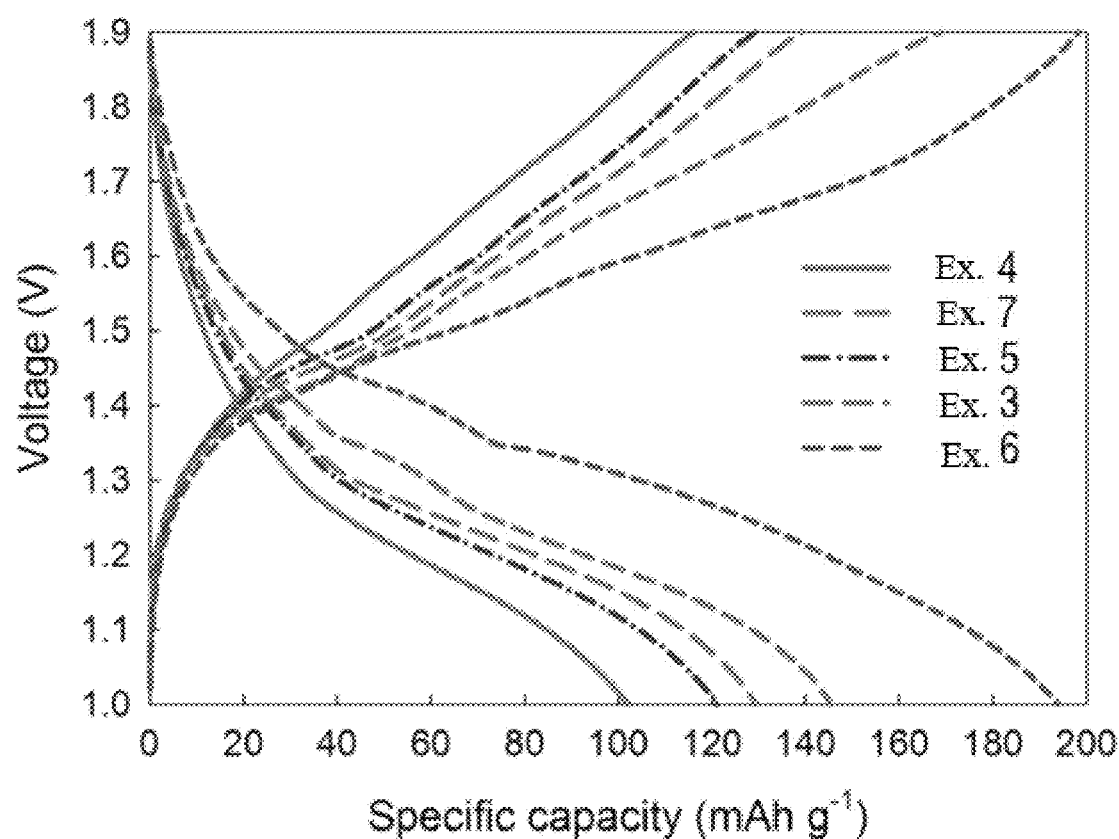
FIG. 10 shows comparison of capacity of to-be-filled zinc-manganese secondary cylindrical batteries in Example 3 to Example 7 after injection of different electrolytes.

FIG. 10 shows comparison of capacity of to-be-filled zinc-manganese secondary batteries in Example 3 to Example 7 after injection of different electrolytes. It is clearly observed that the introduction of cations other than zinc ions to constitute a dual-ion or multi-ion system can exhibit a greater capacity and provide a higher energy density of the battery.

Example 8

Figure 11:
Figure 12:
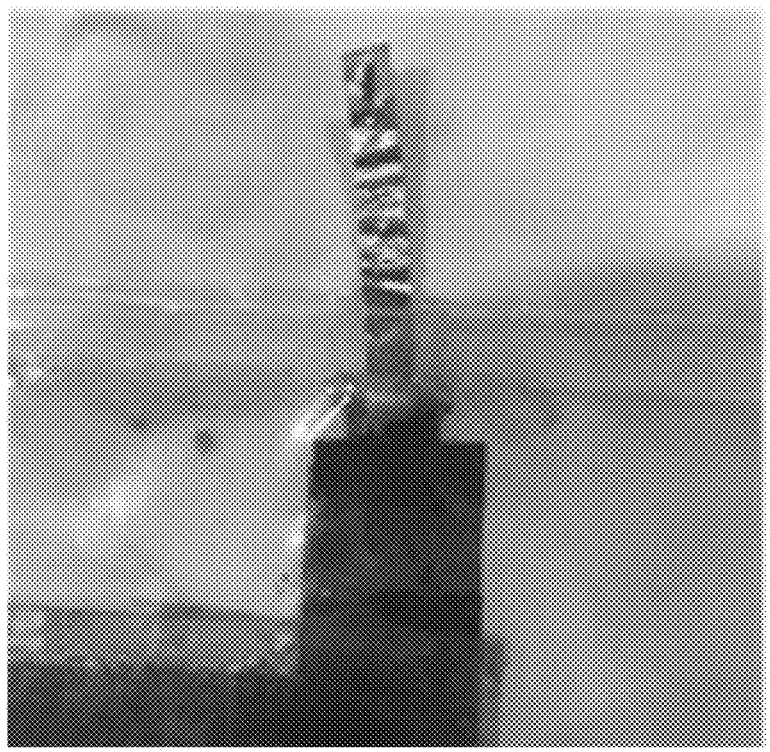
FIG. 12 shows the stacked core package of the to-be-filled zinc-manganese secondary battery of Example 8 after welding spot protection.
Figure 13:
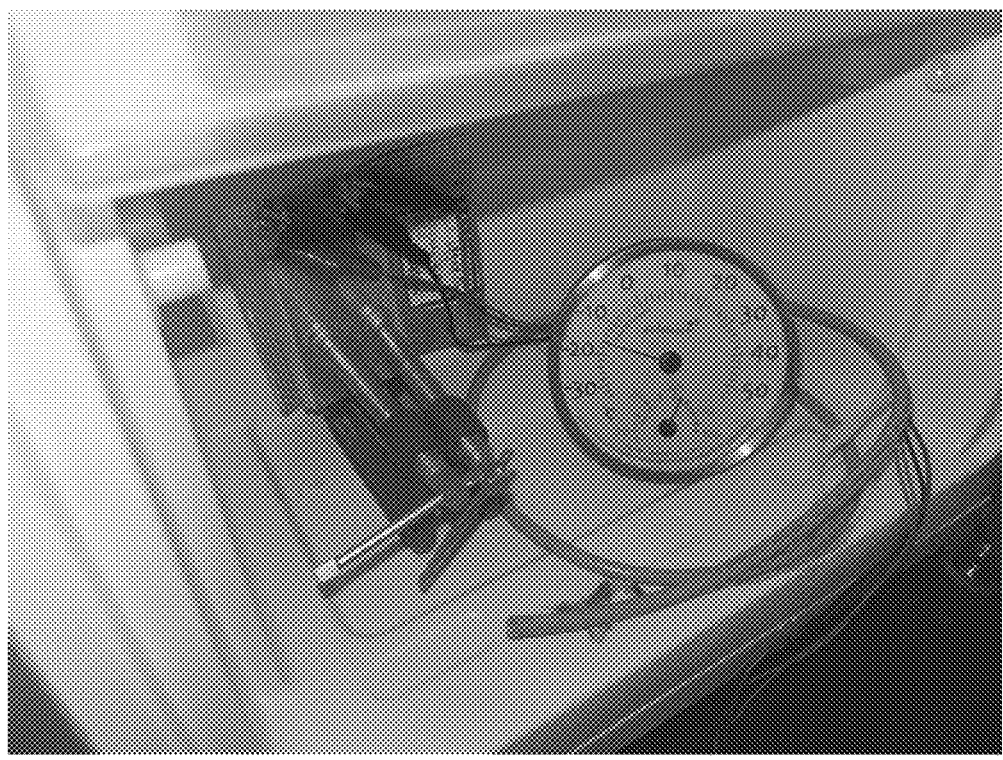
FIG. 13 shows the to-be-filled zinc-manganese secondary battery with aluminum-plastic film packaging in Example 8.

To avoid the occurrence of side reactions during charge and discharge of the zinc-manganese secondary battery, the zinc-manganese secondary battery in this example had a γ-$MnO_2$ semi-dry positive electrode and a zinc powder semi-dry negative electrode as electrodes, and the PPS solid separator manufactured with the PPS powder hydrothermally modified in Example 1 was used to make the prefabricated zinc salt separator. After the electrodes and the prefabricated zinc salt separator were stacked, stainless steel current collectors and nickel tabs were welded by resistance welding. After the welding, the welding spots were protected with epoxy resin to achieve a water-resistant insulation effect. FIG. 11 and FIG. 12 show the stacked cell package of the zinc-manganese secondary battery before and after the protection of the welding spots, respectively. The battery was then packaged with an aluminum-plastic film as the outer packaging material, as shown in FIG. 13.

Figure 14:
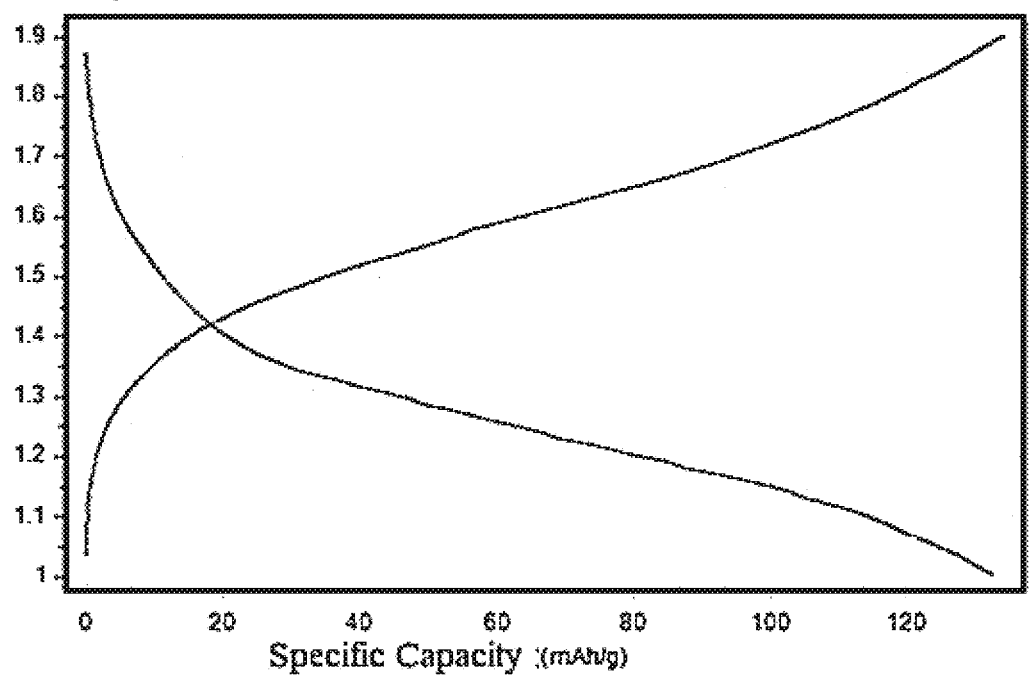
FIG. 14 shows a stable cycle curve of the to-be-filled zinc-manganese secondary battery in Example 8 after undergoing a formation process using water followed by alcohol.

Furthermore, this example also involves a formation method of the afore-mentioned zinc-manganese secondary battery. Specifically, a 1 mol/L sodium sulfate aqueous solution was injected in an injection volume of 7 mL/Ah into the battery. The battery was discharged once with a small current of 10 mA/g and then charged and discharged with the small current for 3 cycles. While the battery was in a discharge state, methanol was injected, in a volume ratio of the aqueous electrolyte to methanol of 5:0.7. Then, vacuum packaging was performed. FIG. 14 shows a charge-discharge curve at 7° C. of the zinc-manganese secondary battery prepared in this example after undergoing a formation process using water followed by alcohol.

Example 9

To avoid the occurrence of side reactions during charge and discharge of the zinc-manganese secondary battery, the zinc-manganese secondary battery in this example had a γ-$MnO_2$ semi-dry positive electrode and a zinc powder semi-dry negative electrode as electrodes, and the PPS solid separator manufactured with the PPS powder hydrothermally modified in Example 2 was used to make the prefabricated zinc salt separator. After the electrodes and the prefabricated zinc salt separator were stacked, a stainless steel current collector and a nickel tab were welded for the positive electrode by resistance welding, and a copper current collector and a copper tab were welded for the negative electrode by resistance welding. The welding spots were protected with unsaturated polyester.

Figure 15:
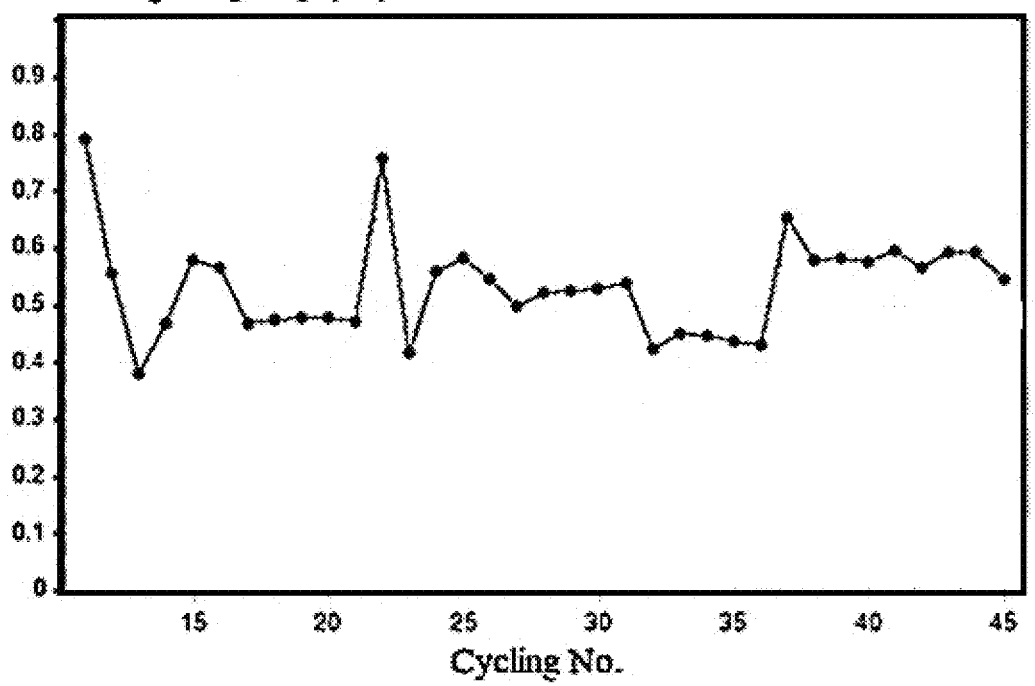
FIG. 15 shows a charge-discharge curve at 7° C. of a to-be-filled zinc-manganese secondary battery in Example 9 after undergoing a formation process using water followed by alcohol.

Furthermore, this example also involves a formation method of the afore-mentioned zinc-manganese secondary battery. Specifically, a 1 mol/L sodium chloride aqueous solution was injected in an injection volume of 8 mL/Ah into the battery. The battery was discharged once with a small current of 20 mA/g and then charged and discharged with the small current for 10 cycles. While the battery was in a discharge state, isopropanol was injected, in a volume ratio of the aqueous electrolyte to isopropanol of 5:2. Then, vacuum packaging was performed. FIG. 15 shows a stable cycle curve of the zinc-manganese secondary battery prepared in this example after undergoing a formation process using water followed by alcohol.

Example 10

To avoid the occurrence of side reactions during charge and discharge of the zinc-manganese secondary battery, the zinc-manganese secondary battery in this example had an ε-$MnO_2$ semi-dry positive electrode and a zinc powder semi-dry negative electrode as electrodes, and the PPS solid separator manufactured with the PPS powder hydrothermally modified was used to make the prefabricated zinc salt separator. After the electrodes and the separator were stacked, stainless steel current collectors and titanium tabs were welded by resistance welding. The welding spots were protected with epoxy resin.

Figure 16A:
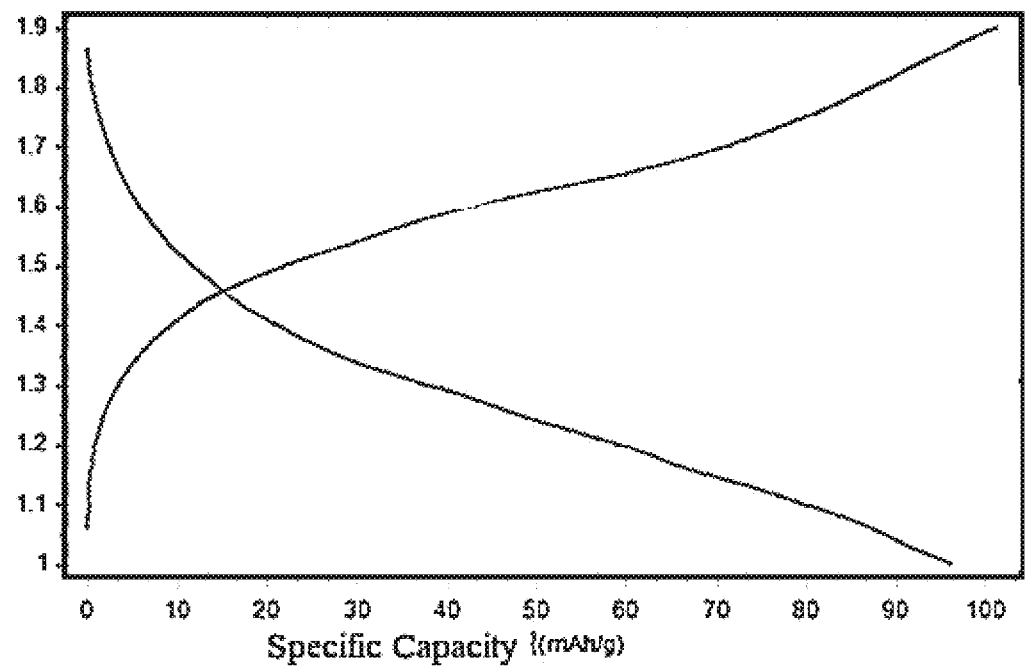
FIGS. 16A-16B show a charge-discharge curve at 0° C. of a to-be-filled zinc-manganese secondary battery in Example 10 after undergoing a formation process using water followed by alcohol.
Figure 16B:
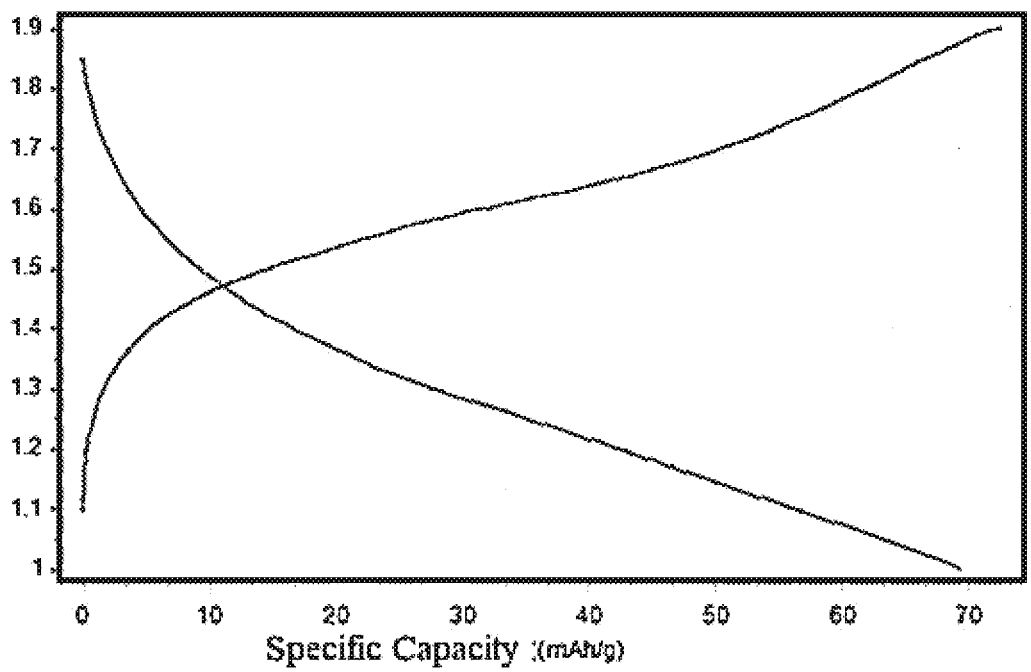

Furthermore, this example also involves a formation method of the afore-mentioned zinc-manganese secondary battery. Specifically, a 1 mol/L zinc sulfate aqueous solution was injected in an injection volume of 10 mL/Ah into the battery. The battery was discharged once with a small current of 20 mA/g and then charged and discharged with the small current for 10 cycles. While the battery was in a discharge state, ethylene glycol was injected, in a volume ratio of the aqueous electrolyte to ethylene glycol of 5:3. Then, vacuum packaging was performed. FIGS. 16A-16B show a charge-discharge curve at 0° C. of the to-be-filled zinc-manganese secondary battery prepared in this example after undergoing a formation process using water followed by alcohol.

Example 11

To avoid the occurrence of side reactions during charge and discharge of the zinc-manganese secondary battery, the to-be-filled zinc-manganese secondary battery in this example had a β-$MnO_2$ semi-dry positive electrode and a zinc powder semi-dry negative electrode as electrodes, and the PPS solid separator manufactured with the PPS powder hydrothermally modified was used to make the prefabricated zinc salt separator. After stacking, a stainless steel current collector and a nickel tab were welded for the positive electrode by resistance welding, and a copper current collector and a copper tab were welded for the negative electrode by resistance welding. The welding spots were protected with furan resin.

Figure 17:
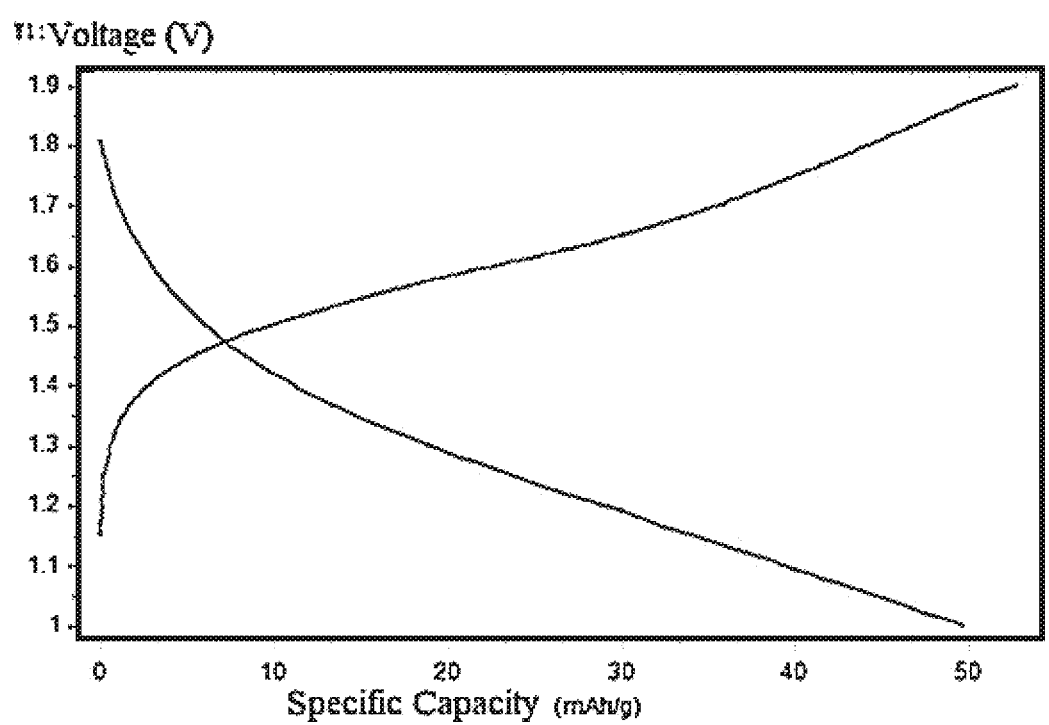
FIG. 17 shows a charge-discharge curve at −10° C. of a to-be-filled zinc-manganese zinc-manganese secondary battery in Example 11 after undergoing a formation process using water followed by alcohol.

Furthermore, this example also involves a formation method of the afore-mentioned zinc-manganese secondary battery. Specifically, a 1 mol/L zinc trifluoromethanesulfonate aqueous solution was injected in an injection volume of 8 mL/Ah into the battery. The battery was discharged once with a small current of 20 mA/g and then charged and discharged with the small current for 5 cycles. While the battery was in a discharge state, isopropanol was injected, in a volume ratio of the aqueous electrolyte to isopropanol of 5:5. Then, vacuum packaging was performed. FIG. 17 shows a charge-discharge curve at −10° C. of the zinc-manganese secondary battery prepared in this example after undergoing a formation process using water followed by alcohol.

Example 12: Manufacturing Equipment and Method of PPS Solid Separator

This example discloses manufacturing equipment of a PPS solid separator, including a powder processing system, a high-speed shearing machine, a screw extruder, a horizontal cold roller press, and a horizontal hot roller press.

Figure 18:
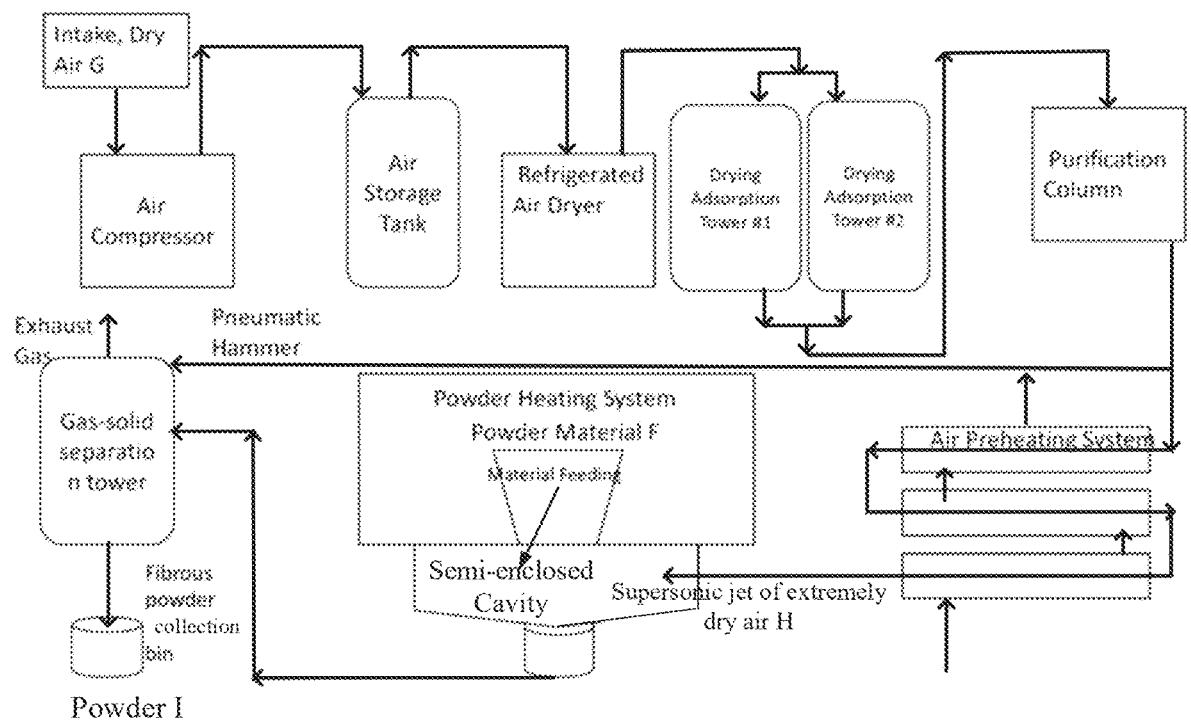
FIG. 18 is a schematic structural view of a powder processing system in Example 12.

The powder processing system includes an air compressor, an air storage tank, a refrigerated air dryer, drying adsorption towers, and a purification column connected in sequence, as well as an air preheating system, a powder heating system, a supersonic shear mixer, and a gas-solid separation tower. FIG. 18 is a schematic structural view of the powder processing system described in this example. The supersonic shear mixer is provided with a semi-enclosed cavity. A gas outlet of the purification column is connected to a gas inlet of the semi-enclosed cavity of the supersonic shear mixer, and the air preheating system is mounted on an air pipeline between the purification column and the supersonic shear mixer. The powder heating system is arranged at a feeding port of the semi-enclosed cavity of the supersonic shear mixer. A material outlet of the semi-enclosed cavity of the supersonic shear mixer is connected to the gas-solid separation tower through a pipeline. An upper part of the gas-solid separation tower is provided with a gas outlet, a bottom of the gas-solid separation tower is provided with a material outlet, and a middle of the gas-solid separation tower is provided with a pneumatic hammer inlet. A plurality of the drying adsorption towers are connected in parallel and are each connected to the gas outlet of the refrigerated air dryer and the gas inlet of the purification column. An air source of the pneumatic hammer is a bypass of dry compressed air from the purification column, and the bypass intermittently releases compressed air to achieve a pneumatic hammer function.

Figure 19:
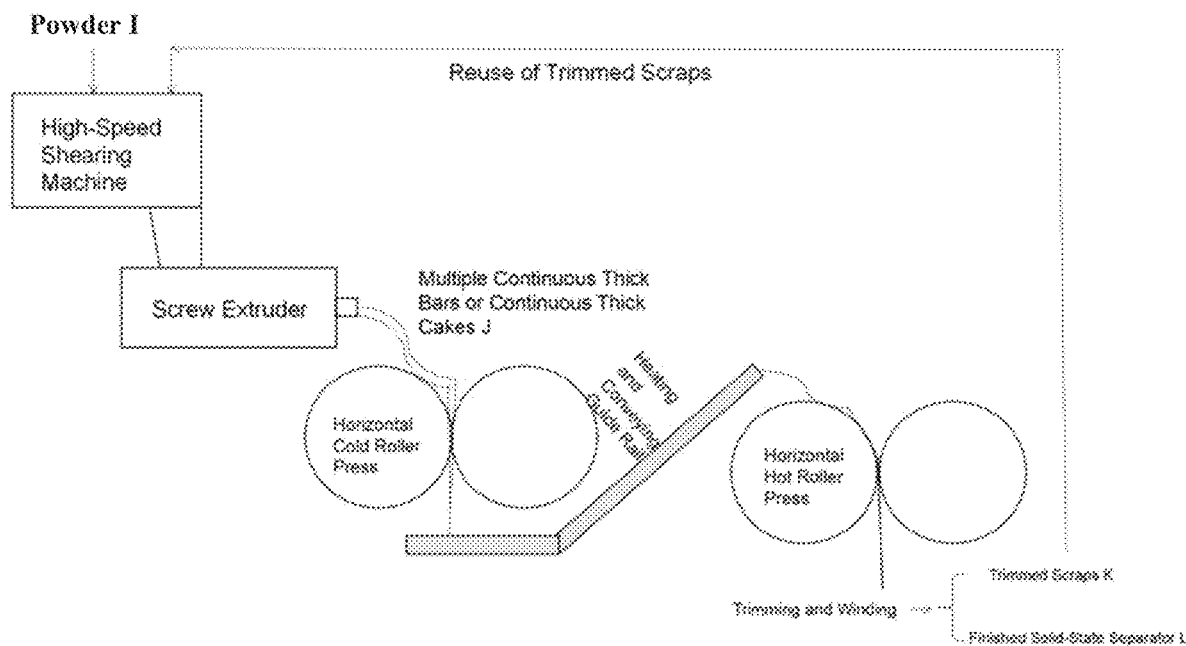
FIG. 19 is a flowchart for forming a PPS solid separator A of Example 12.

The separator fabrication of the powder processed by the powder processing system is completed by the high-speed shearing machine, the screw extruder, the horizontal cold roller press, and the horizontal hot roller press as shown in FIG. 19. The powder processed by the powder processing system is fed into the high-speed shearing machine, and then charged into the screw extruder. The horizontal cold roller press and the horizontal hot roller press are sequentially arranged downstream from the screw extruder, and a heating and conveying guide rail is arranged between the horizontal cold roller press and the horizontal hot roller press.

Example 13: Manufacturing Method of PPS Solid Separator

This example discloses a method for preparing a PPS solid separator using the manufacturing equipment of the PPS solid separator, including:

3 parts by mass of LiCl was dissolved in 12 parts by mass of deionized water to prepare a LiCl solution. 0.5 parts by mass of tetrachloro-p-benzoquinone was mixed with 10 parts by mass of cross-linked high-crystalline PPS powder (crystallinity >70%) to prepare mixed powder C. The LiCl solution was mixed with the mixed powder C to form a slurry D. The slurry D was loaded into a closed reactor to conduct a hydrothermal reaction in an atmosphere of air at a temperature of 210° C. for 2 hours. A filling rate of the hydrothermal reaction was 30%. After the reaction, the powder was washed to neutral and dried to obtain powder E.

6 wt % polytetrafluoroethylene powder and 94 wt % powder E were uniformly mixed in a mixer at a temperature such that polytetrafluoroethylene was in a glassy state, to obtain powder F. Dry atmospheric air G (RH=5%) was compressed through a 15 KW air compressor, cold-dried, drying-adsorbed, and purified. In the drying adsorption process, two drying adsorption towers containing a molecular sieve with a total weight of 400 kg were used. The two towers alternated between operation and regeneration, with an alternating time of 6 minutes. After preheated to 45° C., the dried and purified gas was fed into the semi-enclosed cavity through a nozzle, and accelerated to a supersonic speed to form a supersonic jet of extremely dry air H, with a dew point of −40° C. After preheated to 100° C., the powder F was added to the semi-enclosed cavity, and friction-sheared by the supersonic jet of extremely dry air H, to extend and open the molecular chains of polytetrafluoroethylene in the powder F, forming physical adhesion to the powder in the powder F, without chemical reaction, to obtain powder I. The powder I was blown with an airflow into the solid-gas separation tower equipped with a dust removal filter element inside. The dust removal filter element was configured to separate solid and gas, where the gas was directly discharged, and the adhering powder on the filter element was blown and shaken by the pneumatic hammer into a collection bin below. An air source of the pneumatic hammer was a bypass of purified dry compressed air, and the bypass intermittently released compressed air to achieve a pneumatic hammer function.

Figure 20:
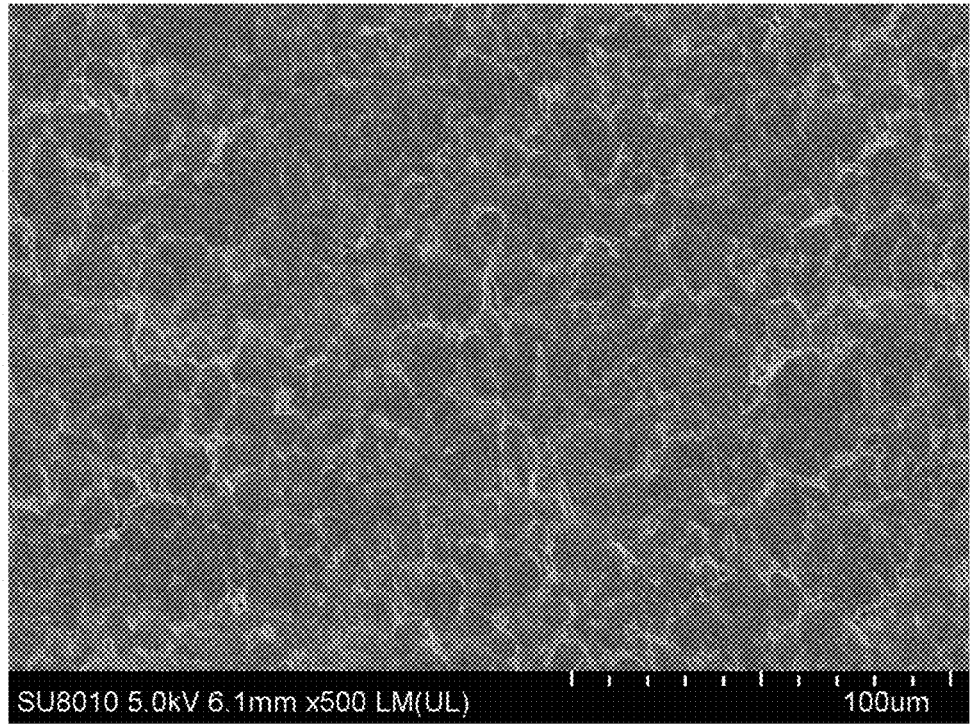
FIG. 20 is a surface SEM image of a PPS solid separator A of Example 13.
Figure 21:
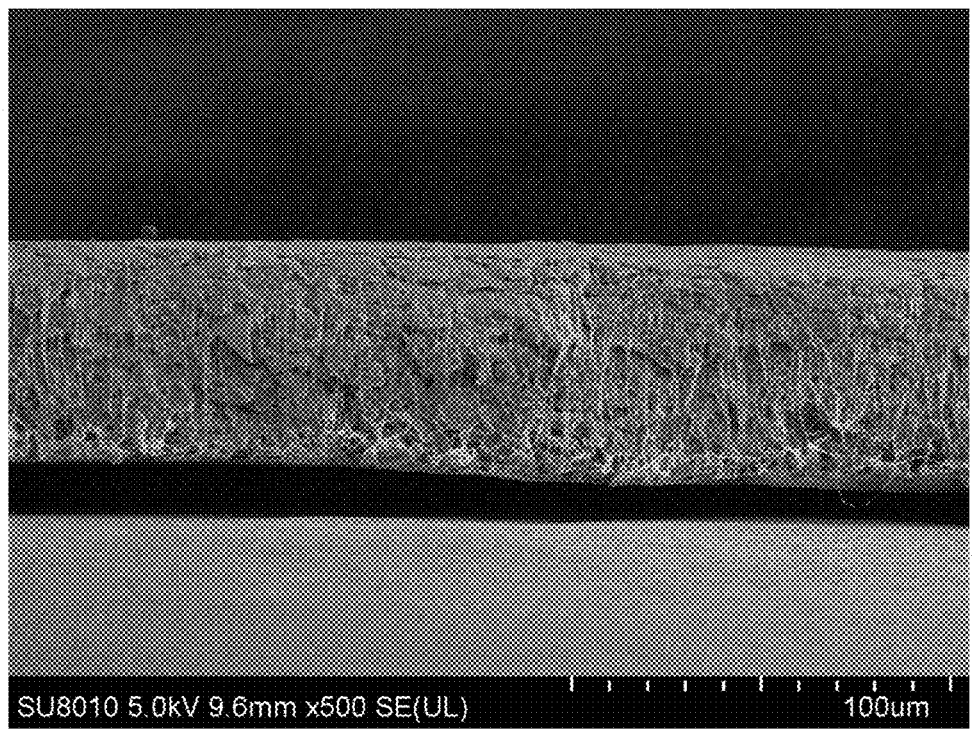
FIG. 21 is a cross-sectional SEM image of the PPS solid separator A of Example 13.

The powder I was added to the high-speed shearing machine for secondary fibrillation. After discharged, the powder was fed into the screw extruder to obtain 10 continuous thick bars J with a diameter of 8 mm. These thick bars J were charged into the horizontal cold roller press with a roll surface temperature of 20° C., for primary thinning to 0.8 mm. After the thinning, the bars were fed onto a 130° C. heating and conveying guide rail and were fed with heating into the horizontal hot roller press with a roll surface temperature of 130° C. for secondary thinning to 30 µm. Two edges were trimmed to produce a finished solid separator L, which was then wound up. The trimmed scrape K was recycled and fed into the high-speed shearing machine for reuse. FIG. 20 shows an SEM image of a surface of the solid separator. FIG. 21 shows a cross-sectional SEM image of the solid separator. The solid separator is a dense film comprised of an entangled network structure formed by fibrous PTFE and plastically deformed PPS crystal particles, with a quite low porosity. The porosity obtained by integral computation in this figure is 3%.

Example 14: Manufacturing Method of PPS Solid Separator 1 part by mass of NaCl was dissolved in 9 parts by mass of deionized water to prepare a NaCl solution. 0.25 parts by mass of tetrachloro-p-benzoquinone was mixed with 10 parts by mass of cross-linked high-crystalline PPS powder (crystallinity >60%) to prepare mixed powder C. The NaCl solution was mixed with the mixed powder C to form a slurry D. The slurry D was loaded into a closed reactor to conduct a hydrothermal reaction in an atmosphere of air at a temperature of 200° C.' for 3 hours. A filling rate of the hydrothermal reaction was 40%. After the reaction, the powder was washed to neutral and dried to obtain powder E.

5 wt % polytetrafluoroethylene powder and 95 wt % powder E were uniformly mixed in a mixer at a temperature such that polytetrafluoroethylene was in a glassy state, to obtain powder F. Dry atmospheric air G (RH=8%) was compressed through a 30 KW air compressor, cold-dried, drying-adsorbed, and purified. In the drying adsorption process, two drying adsorption towers containing a molecular sieve with a total weight of 500 kg were used. The two towers alternated between operation and regeneration, with an alternating time of 8 minutes. After preheated to 50° C., the dried and purified gas was fed into the semi-enclosed cavity through a nozzle, and accelerated to a supersonic speed to form a supersonic jet of extremely dry air H, with a dew point of −45° C. After preheated to 120° C., the powder F was added to the semi-enclosed cavity, and friction-sheared by the supersonic jet of extremely dry air H, to extend and open the molecular chains of polytetrafluoroethylene in the powder F, forming physical adhesion to the powder in the powder F, without chemical reaction, to obtain powder I. The powder I was blown with an airflow into the solid-gas separation tower equipped with a dust removal filter element inside. The dust removal filter element was configured to separate solid and gas, where the gas was directly discharged, and the adhering powder on the filter element was blown and shaken by the pneumatic hammer into a collection bin below. An air source of the pneumatic hammer was a bypass of purified dry compressed air, and the bypass intermittently released compressed air to achieve a pneumatic hammer function.

The powder I was added to the high-speed shearing machine for secondary fibrillation. After discharged, the powder was fed into the screw extruder to obtain continuous thick cakes J with a diameter of 10 mm. These thick cakes J were charged into the horizontal cold roller press with a roll surface temperature of 10° C., for primary thinning to 1 mm. After the thinning, the cakes were fed onto a 130° C. heating and conveying guide rail and were fed with heating into the horizontal hot roller press with a roll surface temperature of 120° C. for secondary thinning to 35 µm. Two edges were trimmed to produce a finished solid separator L, which was then wound up. The trimmed scrape K was recycled and fed into the high-speed shearing machine for reuse.

Example 15: Manufacturing Method of PPS Solid Separator 2 parts by mass of ZnCl was dissolved in 10 parts by mass of deionized water to form a $ZnCl_2$ solution. 0.3 parts by mass of tetrachloro-p-benzoquinone was mixed with 10 parts by mass of cross-linked high-crystallinity PPS powder (crystallinity >60%) to form mixed powder C. The ZnCl solution was mixed with the mixed powder C to form a slurry D. The slurry D was loaded into a closed reactor to conduct a hydrothermal reaction in an atmosphere of argon at a temperature of 220° C. for 1.5 hours. A filling rate of the hydrothermal reaction was 50%. After the reaction, the powder was washed to neutral and dried to form powder E.

4 wt % polytetrafluoroethylene powder and 96 wt % powder E were uniformly mixed in a mixer at a temperature such that polytetrafluoroethylene was in a glassy state, to obtain powder F. Dry atmospheric air G (RH=6%) was compressed through a 30 KW air compressor, cold-dried, drying-adsorbed, and purified. In the drying adsorption process, two drying adsorption towers containing a molecular sieve with a total weight of 1000 kg were used. The two towers alternated between operation and regeneration, with an alternating time of 7 minutes. After preheated to 47° C., the dried and purified gas was fed into the semi-enclosed cavity through a nozzle, and accelerated to a supersonic speed to form a supersonic jet of extremely dry air H, with a dew point of −42° C. After preheated to 125° C., the powder F was added to the semi-enclosed cavity, and friction-sheared by the supersonic jet of extremely dry air H, to extend and open the molecular chains of polytetrafluoroethylene in the powder F, forming physical adhesion to the powder in the powder F, without chemical reaction, to obtain powder I. The powder I was blown with an airflow into the solid-gas separation tower equipped with a dust removal filter element inside. The dust removal filter element was configured to separate solid and gas, where the gas was directly discharged, and the adhering powder on the filter element was blown and shaken by the pneumatic hammer into a collection bin below. An air source of the pneumatic hammer was a bypass of purified dry compressed air, and the bypass intermittently released compressed air to achieve a pneumatic hammer function.

The powder I was added to the high-speed shearing machine for secondary fibrillation. After discharged, the powder was fed into the screw extruder to obtain continuous thick cakes J with a diameter of 7 mm. These thick cakes J were charged into the horizontal cold roller press with a roll surface temperature of 25° C., for primary thinning to 0.8 mm. After the thinning, the cakes were fed onto a 130° C. heating and conveying guide rail and were fed with heating into the horizontal hot roller press with a roll surface temperature of 130° C. for secondary thinning to 40 µm. Two edges were trimmed to produce a finished solid separator L, which was then wound up. The trimmed scrape K was recycled and fed into the high-speed shearing machine for reuse.

Example 16: Manufacturing Method of PPS Solid Separator 3.5 parts by mass of $MgCl_2$ was dissolved in 9 parts by mass of deionized water to form a $MgCl_2$ solution. 0.45 parts by mass of tetrachloro-p-benzoquinone was mixed with 11 parts by mass of cross-linked high-crystallinity PPS powder (crystallinity >60%) to form mixed powder C. The $MgCl_2$ solution was mixed with the mixed powder C to form a slurry D. The slurry D was loaded into a closed reactor to conduct a hydrothermal reaction in an atmosphere of air at a temperature of 215° C. for 3 hours. A filling rate of the hydrothermal reaction was 30%. After the reaction, the powder was washed to neutral and dried to form powder E.

4 wt % polytetrafluoroethylene powder and 96 wt % powder E were uniformly mixed in a mixer at a temperature such that polytetrafluoroethylene was in a glassy state, to obtain powder F. Dry atmospheric air G (RH=6%) was compressed through a 30 KW air compressor, cold-dried, drying-adsorbed, and purified. In the drying adsorption process, two drying adsorption towers containing a molecular sieve with a total weight of 600 kg were used. The two towers alternated between operation and regeneration, with an alternating time of 8 minutes. After preheated to 45° C., the dried and purified gas was fed into the semi-enclosed cavity through a nozzle, and accelerated to a supersonic speed to form a supersonic jet of extremely dry air H, with a dew point of −40° C. After preheated to 130° C., the powder F was added to the semi-enclosed cavity, and friction-sheared by the supersonic jet of extremely dry air H, to extend and open the molecular chains of polytetrafluoroethylene in the powder F, forming physical adhesion to the powder in the powder F, without chemical reaction, to obtain powder I. The powder I was blown with an airflow into the solid-gas separation tower equipped with a dust removal filter element inside. The dust removal filter element was configured to separate solid and gas, where the gas was directly discharged, and the adhering powder on the filter element was blown and shaken by the pneumatic hammer into a collection bin below. An air source of the pneumatic hammer was a bypass of purified dry compressed air, and the bypass intermittently released compressed air to achieve a pneumatic hammer function.

The powder I was added to the high-speed shearing machine for secondary fibrillation. After discharged, the powder was fed into the screw extruder to obtain continuous thick cakes J with a diameter of 9 mm. These thick cakes J were charged into the horizontal cold roller press with a roll surface temperature of 15° C., for primary thinning to 0.9 mm. After the thinning, the cakes were fed onto a 130° C. heating and conveying guide rail and were fed with heating into the horizontal hot roller press with a roll surface temperature of 130° C. for secondary thinning to 40 µm. Two edges were trimmed to produce a finished solid separator L, which was then wound up. The trimmed scrape K was recycled and fed into the high-speed shearing machine for reuse.

Example 17: Manufacturing Method of Manganese Oxide Positive Electrode

Manganese dioxide was mixed with polytetrafluoroethylene. At a temperature below the glass transition temperature of polytetrafluoroethylene, a dry supersonic jet gas was sprayed, to allow the molecular chains of polytetrafluoroethylene to open and physically adhere to the powder of the positive electrode material. An alcohol solution was sprayed into the fiberized powder, and a resultant was internally mixed, sheared, granulated, and hot-rolled into a positive electrode film. Afterwards, multiple layers of the positive electrode film were laminated through multiple cold rolling processes to form a composite positive electrode self-supporting film with a thickness of 100 µm to 150 µm. Finally, the composite positive electrode self-supporting film was laminated with a glue-coated sandblasted stainless steel foil coated through a hot rolling press.

Example 18: Manufacturing Method of Zinc Negative Electrode

Figure 22:
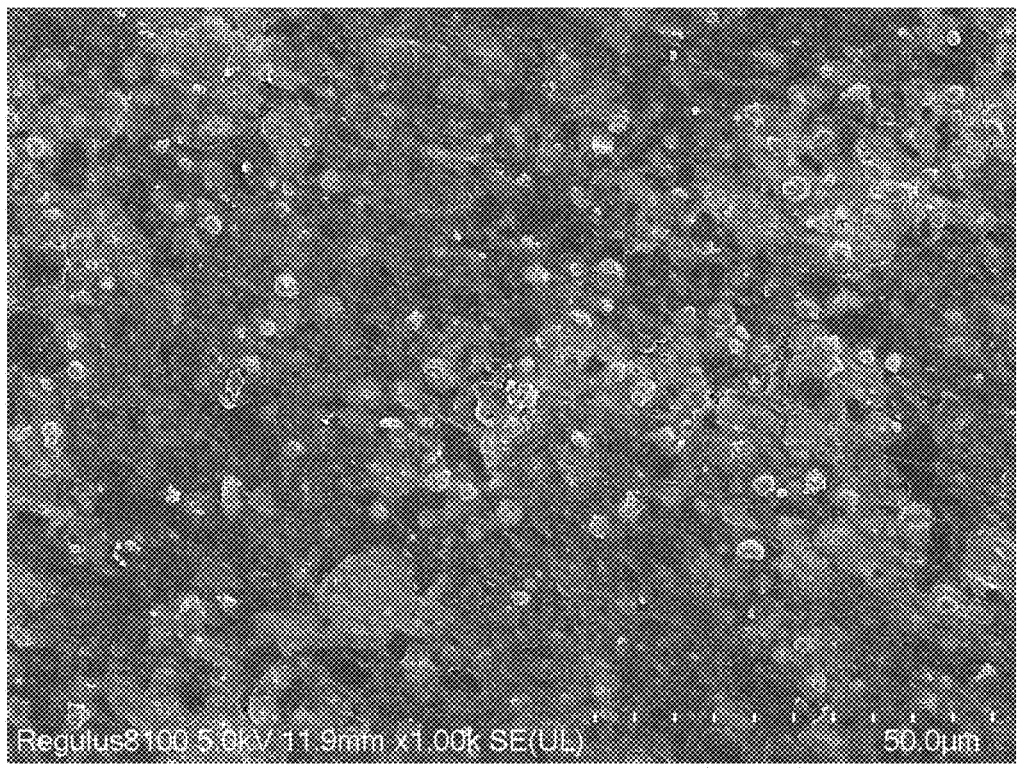
FIG. 22 is a surface SEM image of a negative electrode film of Example 18.
Figure 23:
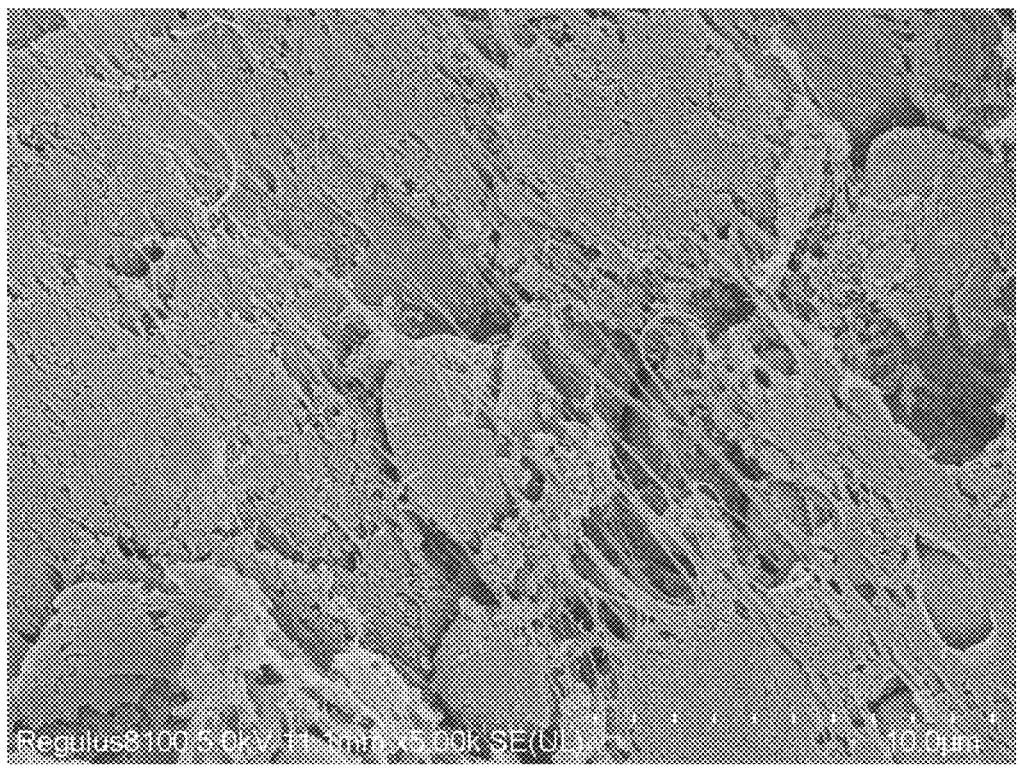
FIG. 23 is a cross-sectional SEM image of the negative electrode film of Example 18, showing a spatially entangled network structure formed by PTFE.

Zinc powder, ECP, high-purity graphite, montmorillonite powder, and indium chloride were mixed uniformly at 74 wt %:7 wt %:5 wt %:5 wt %:1 wt % in a mixer to obtain powder A. 8 wt % polytetrafluoroethylene powder and 92 wt % powder A were mixed uniformly in a mixer at 0° C. to obtain powder B. In a planetary ball mill, a mixed solvent of ethanol and deionized water in a volume ratio of 1:1 was added to the powder B. Under a wet condition, through the high-speed rotation of the ball mill beads, continuous friction caused the PTFE to be drawn into a network structure, and a reduction reaction occurred between indium chloride and zinc powder. After the above process, filtration was conducted to obtain a gel mass C. The gel mass C was internally mixed to form a uniform gel mass, which was then shear-granulated to produce millimeter-sized granules E with a uniform size and a solid content of 50%. The granules E were roll-pressed once at a hot rolling temperature of 80° C. by the horizontal hot roller press, to obtain a negative electrode film F with a thickness of 150 µm. The negative electrode film F was trimmed below the horizontal hot roller to meet the width requirements of the film material. The trimmed scrapes could be cut up and fed into the granules E to recycle the trimmed scrapes. The trimmed negative electrode film F was attached to a support tape of porous release paper to complete winding. After the winding, the entire roll was dried to remove part of the solvent, and the solid content of the semi-dry negative electrode film F was 65%. The surface and cross-sectional structures of the negative electrode film F are shown in FIG. 22 and FIG. 23. The entangled network structure formed by PTFE can make the electrode structure more stable. With a hot pressing lamination process, the semi-dry negative electrode film F from which the release paper had been removed was thermally laminated on both sides of a glue-coated stainless steel foil to form an electrode.

Example 19: Manufacturing Method of Zinc Negative Electrode

Zinc powder, super-P, high-purity graphite, illite powder, and copper chloride were mixed uniformly at 50 wt %:15 wt %:15 wt %:10 wt %:2 wt % in a mixer to obtain powder A. 8 wt % polytetrafluoroethylene powder and 92 wt % powder A were mixed uniformly at in a mixer at 5° C. to obtain powder B. In a planetary ball mill, a predetermined amount of an alcohol solvent was added to the powder B. Under a wet condition, through the high-speed rotation of the ball mill beads, continuous friction caused the material to be drawn into a network structure. The molecular chains of polytetrafluoroethylene in the powder B were extended and opened, forming physical adhesion to the powder in the powder A. A reduction reaction occurred between copper chloride and zinc powder. After the above process, filtration was conducted to obtain a gel mass C. The gel mass C was internally mixed to form a uniform gel mass, which was then shear-granulated to produce millimeter-sized granules E with a uniform size and a solid content of 75%. The granules E were roll-pressed once at a hot rolling temperature of 90° C. by the horizontal hot roller press, to obtain a negative electrode film F with a thickness of 120 μm. The negative electrode film F was trimmed below the horizontal hot roller to meet the width requirements of the film material. The trimmed scrapes could be cut up and fed into the granules E to recycle the trimmed scrapes. The trimmed negative electrode film F was attached to a support tape of porous release paper to complete winding. After the winding, the entire roll was dried to remove part of the solvent, and the solid content of the semi-dry negative electrode film F was 60%. With a hot pressing lamination process, the semi-dry negative electrode film F from which the release paper had been removed was thermally laminated on both sides of a glue-coated stainless steel foil to form an electrode.

Example 20: Manufacturing Method of Zinc Negative Electrode

Zinc powder, ECP, artificial graphite, kaolin, and indium sulfate were mixed uniformly at 60 wt %:10 wt %:8 wt %:10 wt %:4 wt % in a mixer to obtain powder A. 8 wt % polytetrafluoroethylene powder and 92 wt % powder A were mixed uniformly in a mixer at 5° C. to obtain powder B. In a planetary ball mill, a predetermined amount of an alcohol solvent was added to the powder B. Under a wet condition, through the high-speed rotation of the ball mill beads, continuous friction caused the material to be drawn into a network structure. The molecular chains of polytetrafluoroethylene in the powder B were extended and opened, forming physical adhesion to the powder in the powder A. A reduction reaction occurred between indium sulfate and zinc powder. After the above process, filtration was conducted to obtain a gel mass C. The gel mass C was internally mixed to form a uniform gel mass, which was then shear-granulated to produce millimeter-sized granules E with a uniform size and a solid content of 75%. The granules E were roll-pressed once at a hot rolling temperature of 90° C. by the horizontal hot roller press, to obtain a negative electrode film F with a thickness of 120 μm. The negative electrode film F was trimmed below the horizontal hot roller to meet the width requirements of the film material. The trimmed scrapes could be cut up and fed into the granules E to recycle the trimmed scrapes. The trimmed negative electrode film F was attached to a support tape of porous release paper to complete winding. After the winding, the entire roll was dried to remove part of the solvent, and the solid content of the semi-dry negative electrode film F was 60%. With a hot pressing lamination process, the semi-dry negative electrode film F from which the release paper had been removed was thermally laminated on both sides of a glue-coated stainless steel foil to form an electrode.

Example 21: Manufacturing Method of Zinc Negative Electrode

Zinc powder, super-P, artificial graphite, halloysite powder, and copper sulfate were uniformly mixed at 67 wt %:5 wt %:5 wt %:10 wt %:5 wt % in a mixer to obtain powder A. 8 wt % polytetrafluoroethylene powder and 92 wt % powder A were uniformly mixed in a mixer at 0° C. to obtain powder B. In a planetary ball mill, a predetermined amount of an alcohol solvent was added to the powder B. Under a wet condition, through the high-speed rotation of the ball mill beads, continuous friction caused the material to be drawn into a network structure. The molecular chains of polytetrafluoroethylene in the powder B were extended and opened, forming physical adhesion to the powder in the powder A. A reduction reaction occurred between copper sulfate and zinc powder. After the above process, filtration was conducted to obtain a gel mass C. The gel mass C was internally mixed to form a uniform gel mass, which was then shear-granulated to produce millimeter-sized granules E with a uniform size and a solid content of 70%. The granules E were roll-pressed once at a hot rolling temperature of 95° C. by the horizontal hot roller press, to obtain a negative electrode film F with a thickness of 100 μm. The negative electrode film F was trimmed below the horizontal hot roller to meet the width requirements of the film material. The trimmed scrapes could be cut up and fed into the granules E to recycle the trimmed scrapes. The trimmed negative electrode film F was attached to a support tape of porous release paper to complete winding. After the winding, the entire roll was dried to remove part of the solvent, and the solid content of the semi-dry negative electrode film F was 55%. With a hot pressing lamination process, the semi-dry negative electrode film F from which the release paper had been removed was thermally laminated on both sides of a glue-coated stainless steel foil to form an electrode.

What is claimed is:

1. A manufacturing method of a to-be-filled zinc-manganese secondary battery, wherein the to-be-filled zinc-manganese secondary battery is manufactured with a prefabricated zinc salt separator, wherein a manufacturing method of the prefabricated zinc salt separator, comprises:
    (1) providing one of a polyphenylene sulfide (PPS) solid separator (A) and an upper support separator (B) with a glue liquid (C) by dipping or coating, and bonding the PPS solid separator (A) and the upper support separator (B) together with the glue liquid (C) being located between the PPS solid separator (A) and the upper support separator (B); laminating the upper support separator (B) with the PPS solid separator (A) through roll-pressing; and drying the upper support separator (B) and the PPS solid separator (A) that are laminated, to obtain a double-layer prefabricated zinc salt separator (D); and
    (2) providing one of an exposed surface of the PPS solid separator (A) of the double-layer prefabricated zinc salt separator (D) and a lower support separator (F) with a glue liquid (E) by dipping or coating, and bonding the exposed surface of the PPS solid separator (A) of the double-layer prefabricated zinc salt separator (D) and the lower support separator (F) together with the glue liquid (E) being located between the exposed surface of the PPS solid separator (A) of the double-layer prefabricated zinc salt separator (D) and the lower support separator (F); laminating the lower support separator (F) with the double-layer prefabricated zinc salt separator (D) to obtain a three-layer separator; and drying the three-layer separator to obtain a prefabricated zinc salt separator (H),
    wherein the upper support separator (B) and the lower support separator (F) are both porous separators, and the glue liquid (C) and the glue liquid (E) are each a mixture of an organic adhesive and/or an inorganic adhesive, an electrolyte zinc salt, and a solvent, wherein the prefabricated zinc salt separator comprises the PPS solid separator (A), and the upper support separator (B) and the lower support separator (F) located on both sides of the PPS solid separator (A), wherein a mixture comprising the organic adhesive and/or the inorganic adhesive and the electrolyte zinc salt is filled between the upper support separator (B) and the PPS solid separator (A) and between the lower support separator (F) and the PPS solid separator (A), wherein the prefabricated zinc salt separator (H) is arranged between a manganese oxide positive electrode and a zinc negative electrode, electrode tabs are welded, a battery cell is prepared by a stacking machine or a winding machine, the battery cell is placed into a battery case or an aluminum-plastic film pouch, and the battery case or the aluminum-plastic film pouch is sealed and stored for later use, wherein the battery case or the aluminum-plastic film pouch is provided with a sealable liquid injection port, wherein a manufacturing method of the manganese oxide positive electrode comprises: mixing manganese dioxide with polytetrafluoroethylene (PTFE) first;

using a dry supersonic jet gas to allow molecular chains of the PTFE to open and physically adhere to a positive electrode material powder below a glass transition temperature of the PTFE;

spraying an alcohol solution onto fiberized powder;

performing internal mixing and shearing granulation followed by hot-rolling to form a positive electrode film;

laminating multiple layers of the positive electrode film through multiple cold rolling to form a composite positive electrode self-supporting film with a thickness of 100 µm to 150 µm;

and laminating the composite positive electrode self-supporting film with a glue-coated sandblasted stainless steel foil through a hot roller press.

2. The manufacturing method of the to-be-filled zinc-manganese secondary battery according to claim 1, wherein a manufacturing method of the zinc negative electrode comprises:

mixing zinc powder, a conductive agent, a toughening conductive agent, a cationic retarder, and a hydrogen evolution inhibitor uniformly in a mixer to obtain powder (A), wherein the cationic retarder is inorganic powder that is electronegative and swells with water, the hydrogen evolution inhibitor is a metal compound that undergoes a reduction reaction with the zinc powder in an alcohol-water solvent, and a weight ratio of the zinc powder, the conductive agent, the toughening conductive agent, the cationic retarder, PTFE, and the hydrogen evolution inhibitor is (60% to 90%):(1% to 10%):(1% to 10%):(1% to 10%):(3% to 15%):(0.1% to 5%);

mixing PTFE powder and the powder (A) uniformly in the mixer under a temperature condition such that the PTFE is in a glassy state, to obtain powder (B);

mixing the powder (B) and an alcohol-water mixed solvent in a ball mill, wherein the PTFE is continuously rubbed by ball mill beads rotating at a high speed to form a network structure of PTFE filaments, molecular chains of the PTFE in the powder (B) are extended and opened, and physically adhered to powder in the powder (A), the hydrogen evolution inhibitor undergoes the reduction reaction with a surface of the zinc powder, and after above processes are completed, filtration is conducted to obtain a gel mass (C);

subjecting the gel mass (C) to internal mixing to form a uniform gel mass, and shear-granulating the uniform gel mass to produce millimeter-sized granules (E) of a uniform size;

hot-pressing the millimeter-sized granules (E) through a horizontal hot roller press to form a negative electrode film (F), winding the negative electrode film (F) with a porous release paper as a support tape, and drying the negative electrode film (F) attached with the porous release paper as a whole to remove part of the alcohol-water mixed solvent; and with a hot-press lamination process, thermally laminating a semi-dry negative electrode film (F) with the porous release paper removed onto both sides of a glue-coated stainless steel foil, to form the zinc negative electrode.

3. The manufacturing method of the to-be-filled zinc-manganese secondary battery according to claim 2, wherein the zinc powder is powdery particles with a particle size of 5 µm to 20 µm; the conductive agent is one or both of super-P and electrically conductive carbon black (ECP); and the toughening conductive agent is one of, or a mixture of artificial graphite and high-purity graphite.

4. The manufacturing method of the to-be-filled zinc-manganese secondary battery according to claim 2, wherein the cationic retarder is one or more of bentonite, montmorillonite powder, illite powder, kaolin powder, and halloysite powder; and the hydrogen evolution inhibitor is one or more of indium chloride, copper chloride, indium sulfate, and copper sulfate.

5. The manufacturing method of the to-be-filled zinc-manganese secondary battery according to claim 2, wherein the alcohol-water mixed solvent is a mixed solvent of water with isopropanol, propylene glycol, or ethanol, with a volume percentage of the water to alcohol of (40% to 80%):(20% to 60%); and a solid content of the uniform gel mass is 40% to 60%.

6. The manufacturing method of the to-be-filled zinc-manganese secondary battery according to claim 2, wherein when the millimeter-sized granules (E) are roll-pressed once through the horizontal hot roller press at a hot rolling temperature of 55° C. to 95° C., a thickness of the negative electrode film F of 90 µm to 200 µm is achieved.

7. The manufacturing method of the to-be-filled zinc-manganese secondary battery according to claim 2, wherein when the semi-dry negative electrode films (F) are thermally laminated with the glue-coated stainless steel foil, the glue-coated stainless steel foil is sandwiched between two semi-dry negative electrode films (F) with the porous release paper removed; after unwinding, the glue-coated stainless steel foil and the two semi-dry negative electrode films (F) are fed into two oppositely rotating horizontal hot roller presses at a rolling temperature of 30° C. to 120° C., wherein by adjusting a roll gap width and controlling a pressure, the semi-dry negative electrode films (F) are right laminated on the glue-coated stainless steel foil, to avoid breaking the glue-coated stainless steel foil due to excessive deformation of the semi-dry negative electrode films (F) caused by an excessive rolling pressure.

8. The manufacturing method of the to-be-filled zinc-manganese secondary battery according to claim 2, wherein the glue-coated stainless steel foil is produced by printing a high-conductivity paste on both sides of a stainless steel foil with a gravure printing machine, wherein a surface of the stainless steel foil is sandblasted before the printing to remove a surface rolling oil, and the high-conductivity paste comprises high-purity graphite, a non-hydrophilic adhesive, and a non-aqueous solvent.

9. A formation method of a to-be-filled zinc-manganese secondary battery, wherein during a battery formation process, an electrolyte with water exclusively as a solvent is injected into the to-be-filled zinc-manganese secondary battery, and then a primary discharge is conducted with a small current having a current density of 1 mA/g to 20 mA/g, followed by 0 to 40 cycles of charge and discharge; and under a discharge state, an organic solvent is injected, followed by vacuum packaging, wherein the organic solvent is an organic solvent that reduces a freezing point of the water after mixed with the water, and a volume ratio of the electrolyte to the organic solvent is 5:(0.3 to 5).

10. The formation method of the to-be-filled zinc-manganese secondary battery according to claim 9, wherein the electrolyte with the water as the solvent is a 2 mol/L to 3 mol/L zinc trifluoromethanesulfonate aqueous solution, a 2 mol/L to 3 mol/L zinc sulfate aqueous solution, or a 2 mol/L to 3 mol/L zinc chloride aqueous solution; and a liquid injection volume is 3 mL/Ah to 10 mL/Ah.

11. The formation method of the to-be-filled zinc-manganese secondary battery according to claim 9, wherein the organic solvent is alcohol, dimethyl sulfoxide, propylene carbonate, or acetonitrile.

12. The formation method of the to-be-filled zinc-manganese secondary battery according to claim 10, wherein the alcohol is one of, or a mixture of two or more of methanol, isopropanol, ethylene glycol, propylene glycol, and glycerol.

* * * * *